United States Patent
Ten et al.

(10) Patent No.: US 9,073,246 B2
(45) Date of Patent: *Jul. 7, 2015

(54) COINJECTION HOT RUNNER INJECTION MOLDING SYSTEM

(71) Applicant: Mold-Masters (2007) Limited, Georgetown (CA)

(72) Inventors: Valery Ten, Burlington (CA); Fabrice Fairy, Strasbourg (FR); Denis Babin, Georgetown (CA); Scott Gammon, Guelph (CA)

(73) Assignee: Mold-Masters (2007) Limited, Georgetown, ON (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/275,240

(22) Filed: May 12, 2014

(65) Prior Publication Data

US 2014/0248385 A1 Sep. 4, 2014

Related U.S. Application Data

(63) Continuation of application No. 13/910,983, filed on Jun. 5, 2013, now Pat. No. 8,757,998, which is a continuation of application No. 13/238,074, filed on Sep. 21, 2011, now Pat. No. 8,469,687.

(Continued)

(51) Int. Cl.
*B29C 45/23* (2006.01)
*B29C 45/20* (2006.01)
*B29C 45/16* (2006.01)
(Continued)

(52) U.S. Cl.
CPC ............. *B29C 45/20* (2013.01); *B29C 45/2806* (2013.01); *B29C 45/1603* (2013.01); *B29C 45/1735* (2013.01); *B29C 45/1607* (2013.01); *B29C 2045/1609* (2013.01)

(58) Field of Classification Search
CPC .................... B29C 45/1603; B29C 45/2806
USPC .......................................... 425/130, 564, 566
See application file for complete search history.

(56) References Cited

U.S. PATENT DOCUMENTS

| 3,947,175 A | 3/1976 | Melcher |
| 3,947,177 A | 3/1976 | Eckardt |
| 4,035,466 A | 7/1977 | Langecker |

(Continued)

FOREIGN PATENT DOCUMENTS

| AT | 391833 B | 12/1990 |
| EP | 0 262 470 | 4/1988 |

(Continued)

*Primary Examiner* — Tim Heitbrink
(74) *Attorney, Agent, or Firm* — Medler Ferro PLLC

(57) ABSTRACT

A coinjection molding apparatus is disclosed that provides first and second material melt streams to a nozzle. The nozzle defines a first material melt passage for receiving the first material melt stream, a second material melt passage for receiving the second material melt stream and an outer layer melt passage, which receives a portion of the first material melt stream from the first material melt passage. The first material melt stream from the first material melt passage forms an inner layer of a molded article, the second material melt stream from the second material melt passage forms a core layer of the molded article, and the first material melt stream from the outer layer melt passage forms an outer layer of the molded article, wherein the three melt streams combine prior to entering a mold cavity.

20 Claims, 22 Drawing Sheets

Related U.S. Application Data

(60) Provisional application No. 61/391,412, filed on Oct. 8, 2010, provisional application No. 61/405,949, filed on Oct. 22, 2010, provisional application No. 61/384,984, filed on Sep. 21, 2010.

(51) Int. Cl.
*B29C 45/17* (2006.01)
*B29C 45/28* (2006.01)

(56) References Cited

U.S. PATENT DOCUMENTS

| | | | |
|---|---|---|---|
| 4,657,496 A | 4/1987 | Ozeki et al. | |
| 5,030,077 A | 7/1991 | Orimoto et al. | |
| 5,131,830 A | 7/1992 | Orimoto et al. | |
| 5,143,681 A | 9/1992 | Daubenbuchel et al. | |
| 5,143,733 A | 9/1992 | Von Buren et al. | |
| 5,156,857 A | 10/1992 | Wang et al. | |
| 5,286,184 A | 2/1994 | Nakayama | |
| 5,914,138 A | 6/1999 | Swenson | |
| 5,935,615 A | 8/1999 | Gellert et al. | |
| 5,935,616 A | 8/1999 | Gellert et al. | |
| 5,942,257 A | 8/1999 | Gellert et al. | |
| 6,030,198 A | 2/2000 | Babin | |
| 6,099,780 A | 8/2000 | Gellert | |
| 6,187,241 B1 | 2/2001 | Swenson | |
| 6,245,278 B1 | 6/2001 | Lausenhammer et al. | |
| 6,261,075 B1 | 7/2001 | Lee et al. | |
| 6,273,706 B1 | 8/2001 | Gunther | |
| 6,274,075 B1 | 8/2001 | Gellert | |
| 6,332,767 B1 | 12/2001 | Kudert et al. | |
| 6,350,401 B1 | 2/2002 | Gellert | |
| 6,440,350 B1 | 8/2002 | Gellert et al. | |
| 6,596,213 B2 | 7/2003 | Swenson | |
| 6,648,622 B1 | 11/2003 | Gellert et al. | |
| 6,649,101 B2 | 11/2003 | Kermet | |
| 6,655,945 B1 | 12/2003 | Gellert et al. | |
| 6,908,581 B2 | 6/2005 | Sabin et al. | |
| 7,175,419 B2 | 2/2007 | Babin | |
| 7,306,446 B2 | 12/2007 | Sabin et al. | |
| 7,364,425 B2 | 4/2008 | Fairy | |
| 7,399,442 B2 | 7/2008 | Sabin et al. | |
| 7,510,387 B2 | 3/2009 | Sicilia | |
| 7,517,480 B2 | 4/2009 | Sabin et al. | |
| 7,527,490 B2 | 5/2009 | Fairy | |
| 7,713,046 B2 | 5/2010 | Fairy | |
| 7,731,489 B2 | 6/2010 | Fairy | |
| 8,469,687 B2 * | 6/2013 | Ten et al. | 425/130 |
| 8,757,998 B2 * | 6/2014 | Ten et al. | 425/130 |
| 2005/0140061 A1 | 6/2005 | Puniello et al. | |
| 2006/0097083 A1 | 5/2006 | Hofstetter et al. | |
| 2009/0181120 A1 | 7/2009 | Fairy | |
| 2010/0007048 A1 | 1/2010 | Schweininger et al. | |
| 2011/0115122 A1 | 5/2011 | Abe et al. | |
| 2011/0217496 A1 | 9/2011 | Swenson | |

FOREIGN PATENT DOCUMENTS

| | | |
|---|---|---|
| GB | 1441347 A | 6/1976 |
| JP | 61-274912 | 12/1986 |
| JP | 02022022 A | 1/1990 |
| JP | 03024928 A | 2/1991 |
| JP | 4-84654 A | 3/1992 |
| JP | 2008265188 A | 11/2006 |
| JP | 2008-265188 | 11/2008 |
| WO | 2011/006999 A1 | 1/2011 |

\* cited by examiner

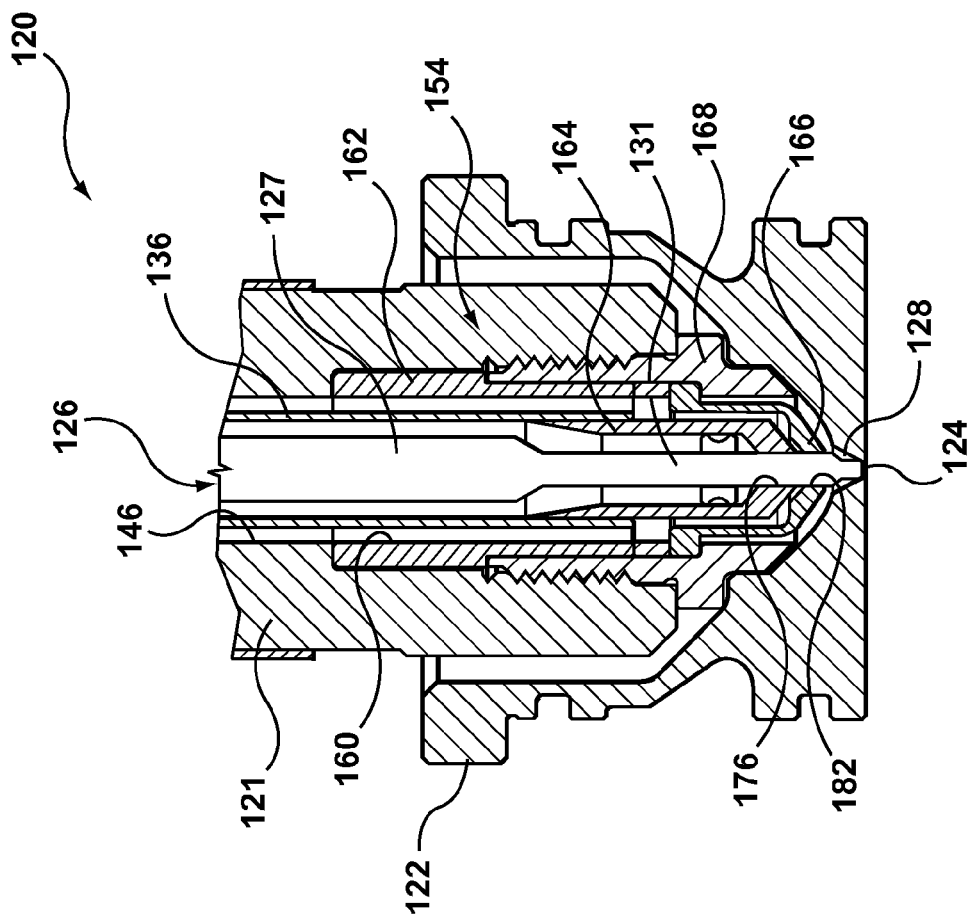
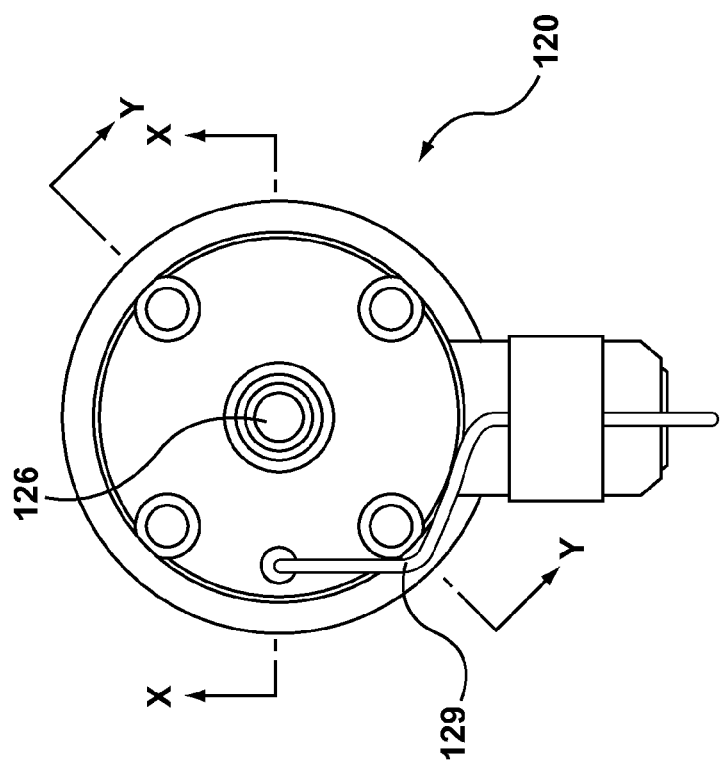
FIG. 3A
FIG. 3

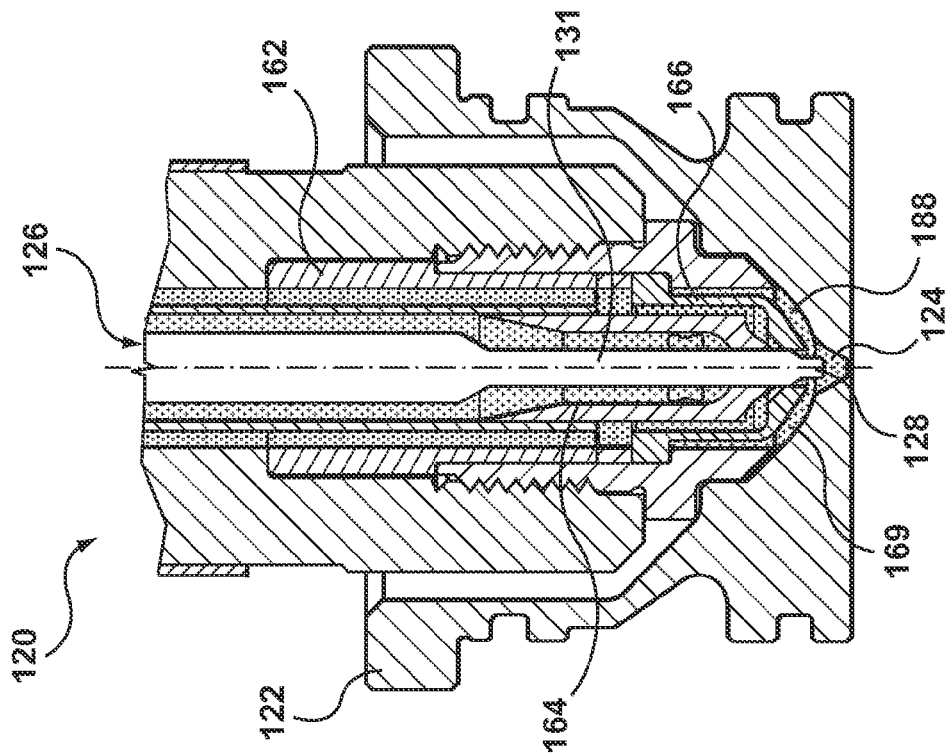
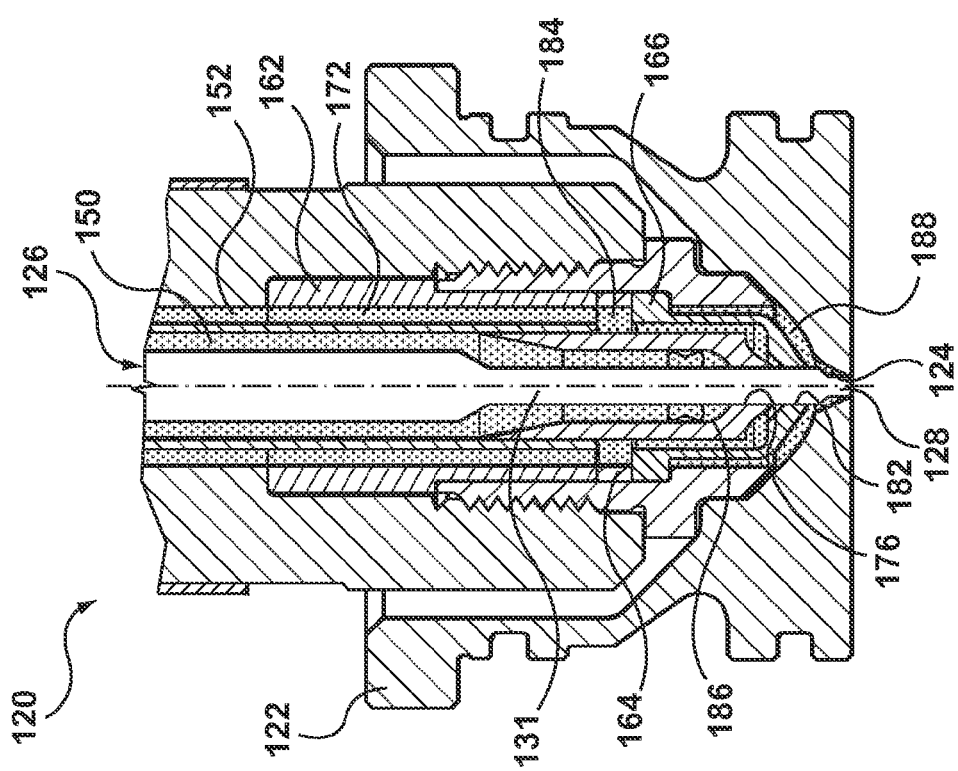
FIG. 4A
FIG. 4B

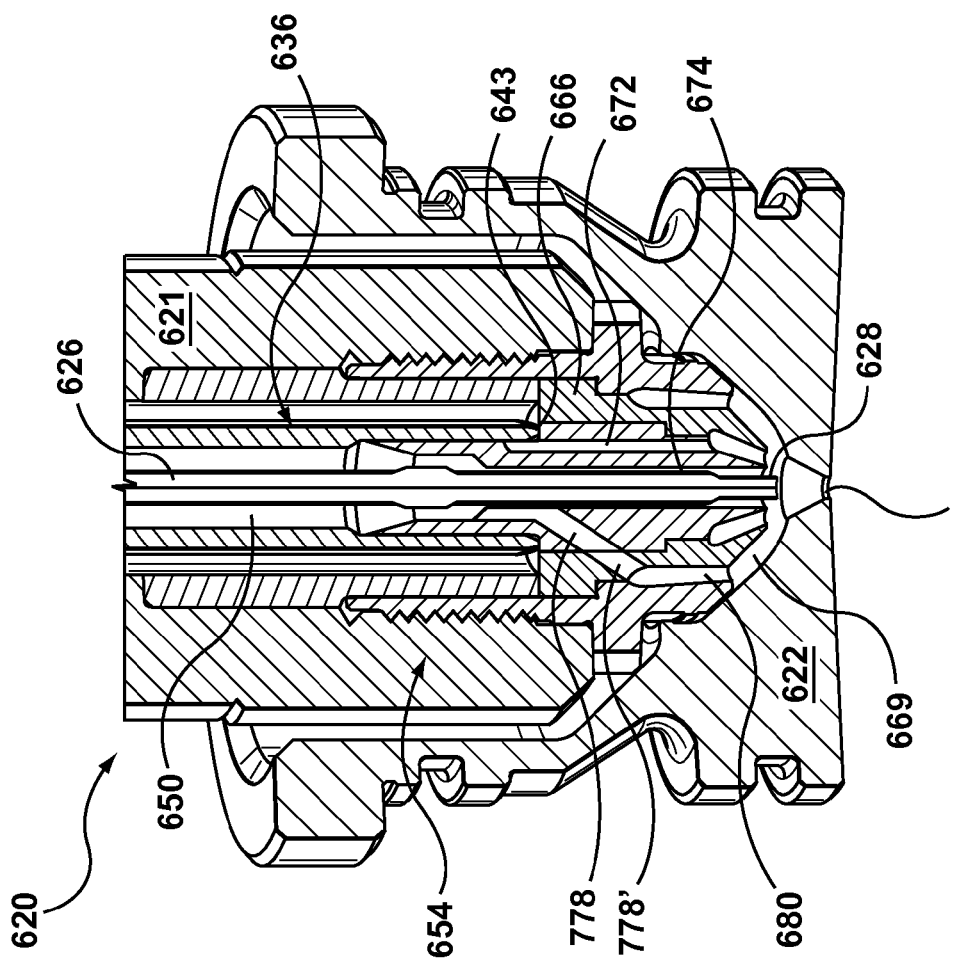

COINJECTION HOT RUNNER INJECTION MOLDING SYSTEM

CROSS-REFERENCE TO RELATED APPLICATIONS

This application is a continuation of U.S. application Ser. No. 13/910,983, filed Jun. 5, 2013, now U.S. Pat. No. 8,757, 998, which is a continuation of U.S. application Ser. No. 13/238,074, filed Sep. 21, 2011, now U.S. Pat. No. 8,469,687, which claims benefit under 35 U.S.C. §119(e) to U.S. Appl. No. 61/384,984, filed Sep. 21, 2010, U.S. Appl. No. 61/391, 412, filed Oct. 8, 2010, and U.S. Appl. No. 61/405,949, filed Oct. 22, 2010, each of which is incorporated by reference herein in its entirety.

FIELD OF THE INVENTION

The present invention relates to injection molding and more particularly to a coinjection hot runner injection molding system that controls flow of multiple melt streams of moldable material through a mold gate and into a mold cavity.

BACKGROUND OF THE INVENTION

It is known in the art of injection molding to simultaneously or sequentially inject two melt streams of moldable material into a mold cavity using a single hot runner injection molding nozzle, which is commonly referred to as coinjection. A conventional manner of controlling the flow of two or more melt streams through the nozzle and into a mold gate and subsequently the cavity has been provided by rotating a valve pin member of the nozzle to align different melt channels or by axially reciprocating a valve pin member and one or more valve sleeve members, which surround the valve pin member, of the nozzle between open and closed positions. Although many systems have been developed utilizing a valve pin member and a valve sleeve member that are axially reciprocated to provide simultaneous or sequential injection of two or more melt streams, such arrangements are not without their deficiencies, such as inaccuracies in reciprocating movement and difficulties in keeping the melt streams adequately separated, as well as adding complexity to the manufacture, assembly, and operation of the hot half of the injection molding systems. Another deficiency in such systems is that it is difficult to align a valve sleeve member and/or a valve pin member with the mold gate, such aligning being important for improving injection technique and reducing gate wear.

SUMMARY OF THE INVENTION

Embodiments hereof are directed to coinjection molding apparatus that provide a first material melt stream and a second material melt stream to a hot runner injection molding nozzle. The nozzle includes a first material melt passage for receiving the first material melt stream, a second material melt passage for receiving the second material melt stream and an outer layer melt passage, wherein a portion of the first material melt stream from the first material melt passage is directed to the outer layer melt passage via one or more tunnel channels that cross the second material melt stream. The first material melt stream from the first material melt passage is directed to a mold cavity for forming an inner layer of a molded article, the second material melt stream from the second material melt passage is directed to the mold cavity for forming a core or barrier layer of the molded article, and the first material melt stream from the outer layer melt passage is directed to the mold cavity for forming an outer layer of the molded article, wherein the three melt streams combine either within the nozzle tip or within a gate area prior to entering the mold cavity via a mold gate.

BRIEF DESCRIPTION OF THE FIGURES

The foregoing and other features and advantages of the invention will be apparent from the following description of embodiments thereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIG. 3 is a top view of a hot runner injection molding nozzle shown removed from the system of FIG. 1.

FIGS. 3A-3C and 4A-4C are sectional views taken along line X-X of FIG. 3 of a gate area of the nozzle, with FIGS. 3A and 4A showing a valve pin in a gate closed position, with FIGS. 3B and 4B showing the valve pin in a partially open or retracted position allowing a first layer flow through the gate and with FIGS. 3C and 4C showing the valve pin in a fully open or retracted position allowing the first layer flow and a second layer flow and a third layer flow through the gate.

FIGS. 6A-6C and FIGS. 7A-7C are enlarged sectional views of gate area A depicted in FIG. 6, with FIGS. 6A and 7A showing a valve pin and a sleeve in a closed position, with FIGS. 6B and 7B showing the valve pin in an open or retracted position allowing flow of an inner layer and outer layer of a first moldable material through a mold gate and with FIGS. 6C and 7C showing a sleeve as well as the valve pin in an open or retracted position allowing a middle layer of a second moldable material to flow through the gate between the inner and outer layers of the first moldable material.

DETAILED DESCRIPTION OF THE INVENTION

Specific embodiments of the present invention are now described with reference to the figures, wherein like reference numbers indicate identical or functionally similar elements. In the following description, "downstream" is used with reference to the direction of mold material flow from an injection unit of an injection molding machine to a mold cavity of a mold of an injection molding system, and also with reference to the order of components or features thereof through which the mold material flows from the injection unit to the mold cavity, whereas "upstream" is used with reference to the opposite direction. The following detailed description is merely exemplary in nature and is not intended to limit the invention or the application and uses of the invention. Although the description of embodiments hereof is in the context of a hot runner injection molding system, the invention may also be used in other molding applications where it is deemed useful, nonlimiting examples of which include molding of thermoset resins such as liquid silicone rubber or the like. Furthermore, there is no intention to be bound by any expressed or implied theory presented in the preceding technical field, background, brief summary or the following detailed description.

Figure 1:
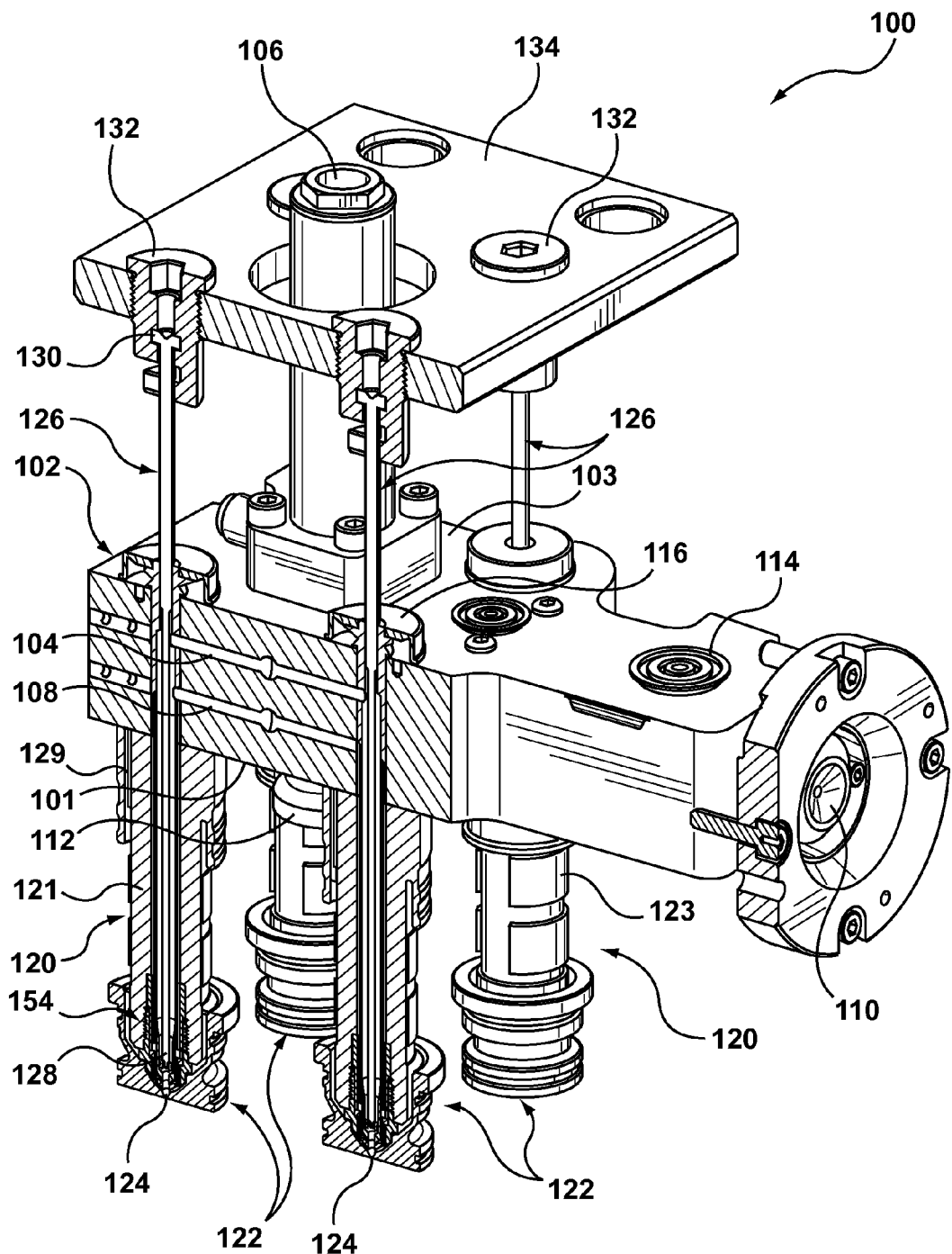
FIG. 1 is a perspective view of a coinjection hot runner injection molding system in accordance with an embodiment hereof shown in partial section.
Figure 2:
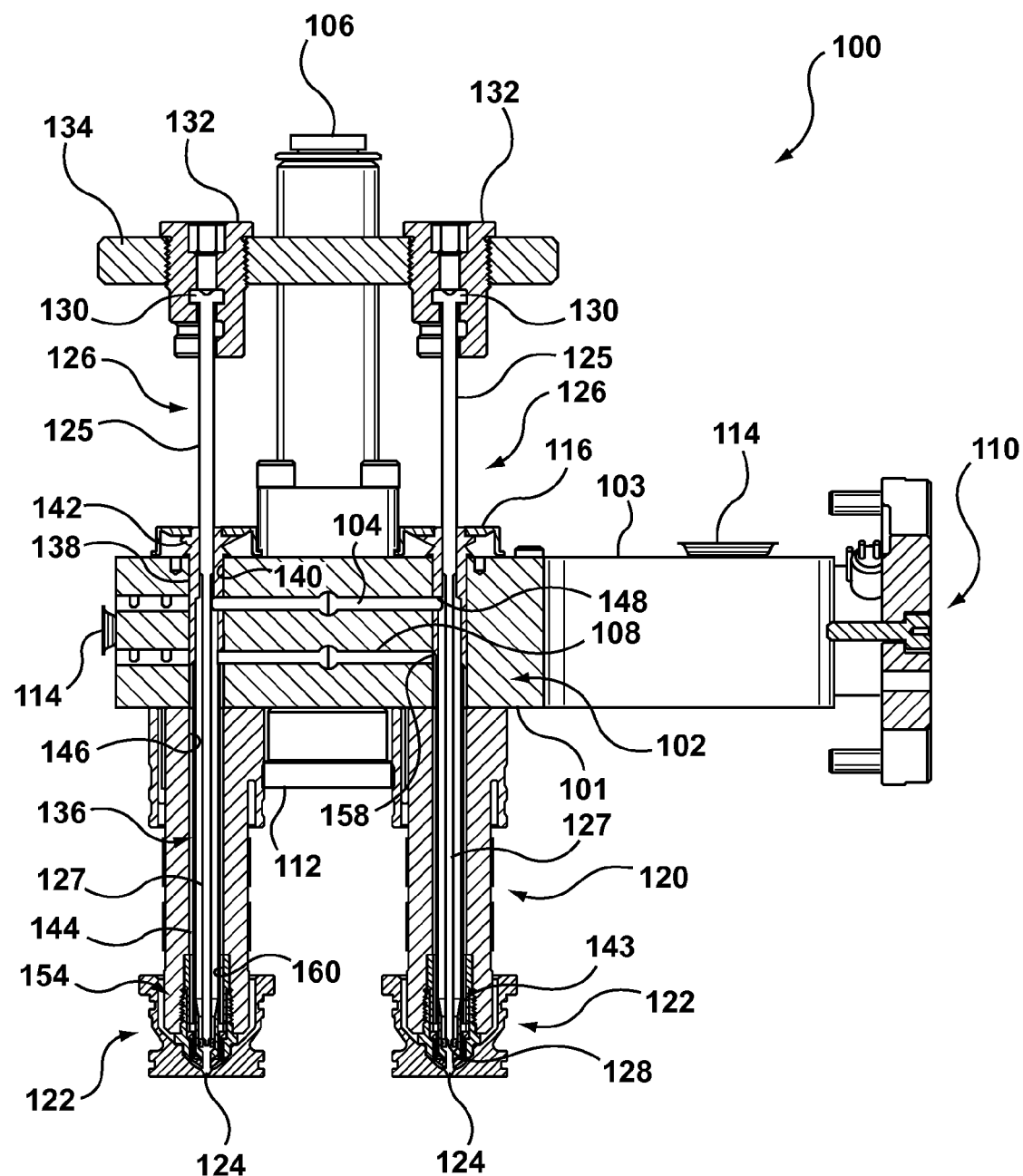
FIG. 2 is a front view of the system of FIG. 1.

FIG. 1 is a perspective view of a hot runner coinjection apparatus 100 in accordance with an embodiment hereof shown in partial section, with FIG. 2 being a side view of coinjection apparatus 100. It would be understood by one of ordinary skill in the art that coinjection apparatus 100 constitutes a hot half of a molding system that is designed to mate with a cold half or cavity side of the molding system in an injection molding machine (not shown). It also would be understood by one of ordinary skill in the art that coinjection apparatus 100 is housed within various mold plates (not shown), such as for example a backing plate, a manifold plate and/or cavity plates, etc.

Coinjection apparatus 100 includes a manifold 102 having a first set of runners or melt channels 104 for receiving a melt stream of a moldable skin material from a first melt source (not shown) via a first melt inlet or sprue 106 and also having a second set of runners or melt channels 108 for receiving a second melt stream of a moldable core material from a second melt source (not shown) via a second melt inlet or sprue 110. The first and second set of manifold runners 104, 108 are independent and do not communicate with each other, such that the skin material and core material melt streams do not combine in manifold 102. The lengths, diameters or widths, and general geometry of the first and second set of manifold runners 104, 108 depend on the specific application and the amounts and natures of the skin and core moldable materials. Manifold 102 is provided with a heater (not shown) to maintain the temperature of the first and second melt streams of the respective skin and core moldable materials. In an embodiment, the skin material of the skin melt stream is a main, or surface material for molding an inner and outer layer of a molded article, such as a cap for a plastic bottle, with the core material of the core melt stream being a barrier material for molding a middle, barrier or filler layer disposed between the inner and outer surface layers of the molded article. Manifold 102 is located within cooled mold plates (not shown) surrounded by an insulative air gap. A position of manifold 102 within the air gap is maintained during operation by a locating ring 112 and various pressure disks 114, 116.

Figure 3A:
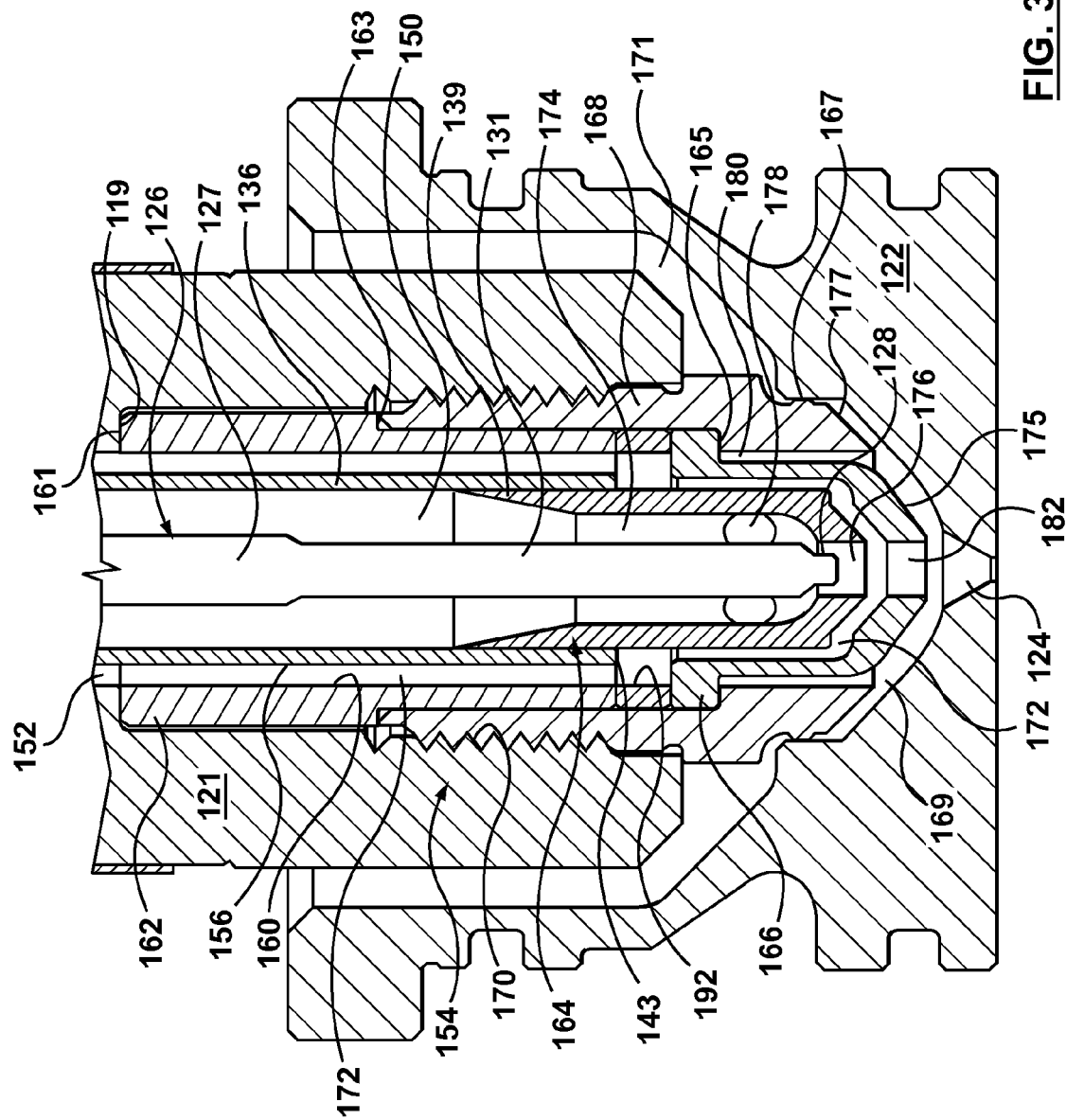
FIG. 3AA is an enlarged sectional view taken along line X-X of FIG. 3 of a gate area of the nozzle in a fully open or retracted position allowing a first layer flow, a second layer flow and a third layer flow through a gate.

Coinjection apparatus 100 is shown having four hot runner valve-gated nozzles 120 extending between a downstream surface 101 of manifold 102 to a respective mold gate insert 122, each of which defines a respective mold gate 124. Although a gate area and mold gate 124 of coinjection apparatus 100 is formed by mold gate insert 122, this is by way of illustration rather than limitation as one of skill in the art would recognize that the gate area may defined instead by one or more other injection molding structure(s), such as a mold gate and gate area defined in a mold cavity plate, without departing from the scope of the present invention. As is conventional, each valve-gated nozzle 120 includes, inter alia, a nozzle body 121, a nozzle heater 123, a thermocouple 129 and other components as would be known to one of ordinary skill in the art. Nozzle body 121 is generally cylindrical and includes a longitudinal bore 146, which is also generally cylindrical. The longitudinal bore 146 of each nozzle 120 is aligned with a longitudinal bore 140 of manifold 102. An actuatable valve pin 126 slidably extends through bores 140, 146 of manifold 102 and nozzle 120, respectively, with a tip portion 128 of valve pin 126 being shown unseated or refracted from mold gate 124 in FIGS. 1 and 2. A head portion 130 of each valve pin 126 is coupled to a respective valve pin coupler 132 held within an actuation plate 134 in a manner as would be known to one of ordinary skill in the art. In an embodiment, actuation plate 134 and subsequently valve pins 126 coupled thereto is actuated between respective open and closed position by an electronic servomotor drive, such as synchro-plate valve pin actuation provided by an E-Drive™ System available from Mold-Masters Limited of Georgetown, Ontario Canada, that allows a stroke distance of valve pin 126 to be adjusted by an operator. In another embodiment, a solenoid actuator that provides incremental movement of the valve pin may be used. In various other embodiments, any valve pin actuation system that allows the valve pin to be moved incrementally may be used. Valve pin 126 includes a sealing segment 125 that steps or narrows to a pin body segment 127 that steps or narrows to a tip guiding segment 131, as shown in FIG. 3AA, that in turn steps or narrows to a tip portion 128 at a downstream end thereof. In an embodiment (not shown), valve pin 126 has more or fewer segments than are shown in the present embodiment.

Although coinjection apparatus 100 is shown having four valve-gated nozzles 120 and related components, this set-up merely serves as an example, as more or fewer valve-gated nozzles and related components may readily be used without altering the principles of the invention. Further, valve pin actuation by way of an actuator plate is also shown by example and not limitation. In another embodiment, each valve pin is coupled to an individual actuator such as a piston housed within a cylinder.

Figure 1A:
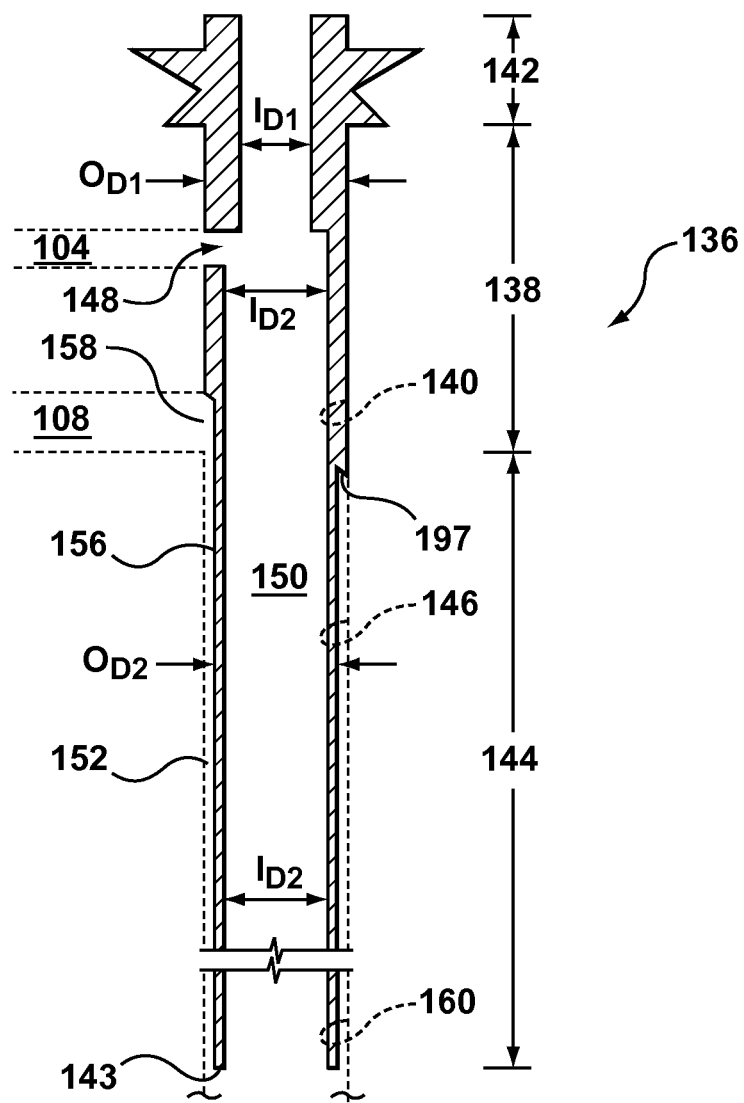
FIG. 1A is a sectional view of a sleeve component of the injection molding system of FIG. 1 in accordance with an embodiment hereof.

Manifold 102 and each nozzle 120 are adapted to receive an elongate sleeve 136 through respective bores 140, 146 in which valve pin 126 slidably extends. With references to FIGS. 1, 1A and 2, sleeve 136 is an elongate tubular structure having a radially extending head segment 142 that sits or is sandwiched between pressure disk 116 and an upstream surface 103 of manifold 102. Sleeve 136 has a sealing segment 138 that extends within manifold bore 140 and a melt channel segment 144 that begins in manifold bore 140 and extends within nozzle bore 146. Sleeve sealing segment 138 has an outer diameter $O_{D1}$ that extends from radial head segment 142 to the intersection between manifold bore 140 and runners 108. A diverting face 197 is formed on a downstream end of sleeve sealing segment 138 for directing the melt stream received from runners 108 as discussed below. Sealing segment 138 outer diameter $O_{D1}$ is sized to be substantially equal to a diameter of manifold bore 140 to provide a tight fit therebetween, which aids in preventing melt leakage. Melt channel segment 144 of sleeve 136 is defined by a second outer diameter $O_{D2}$, which is less than sealing segment first outer diameter $O_{D1}$, that substantially begins at diverting face 197 and continues to a downstream end 143 thereof. Sleeve sealing segment 138 also includes a sealing inner diameter $I_{D1}$ that is sized to be substantially equal to an outer diameter of valve pin sealing segment 125 while still allowing for sliding movement of valve pin 126 therein. Sleeve 136 also has an inner diameter $I_{D2}$, which is greater than sealing inner diameter $I_{D1}$, that begins substantially adjacent to a side opening 148 and is maintained downstream of side opening 148 to downstream end 143 for the remaining length of sleeve 136.

Side opening 148 of sleeve 136 is positioned within manifold bore 140 to provide fluid communication between the first set of manifold runners 104 and a skin material melt channel 150 having inner diameter $I_{D2}$ defined within or by fixed sleeve 136. The melt stream of skin material received from runners 104 flows through skin material melt channel 150 around valve pin body and guiding segments 127, 131, which extend therein, to be delivered from sleeve downstream end 143 within a nozzle tip 154, wherein the skin melt stream can be split into two melt flows as described in more detail below. A core material melt channel 152 is defined between an outer surface 156 of sleeve melt channel segment 144 and manifold and nozzle bores 140, 146 and a core material melt passage 172 is defined between outer surface 156 of sleeve melt channel segment 144 and an inner surface 160 of nozzle tip 154, as represented by dashed lines in FIG. 1A. Accordingly, sleeve 136 effectively divides manifold bore 140 and nozzle bore 146 into two concentric melt channels, with skin material melt channel 150 being surrounded by annular core material melt channel 152. Core material melt channel 152 is in fluid communication with an outlet 158 of the second set of manifold runners 108, also represented by dashed lines in FIG. 1A, to receive the melt stream of the core material therefrom and to deliver the core material melt stream within nozzle tip 154, wherein the melt stream of core material is directed to flow within or between the melt flow of the skin material as described in more detail below. As such, sleeve 136 acts as a flow separator to keep the melt streams of the skin and barrier materials separated as they flow from manifold 102 into the various melt passages of nozzle tip 154.

Figure 3C:
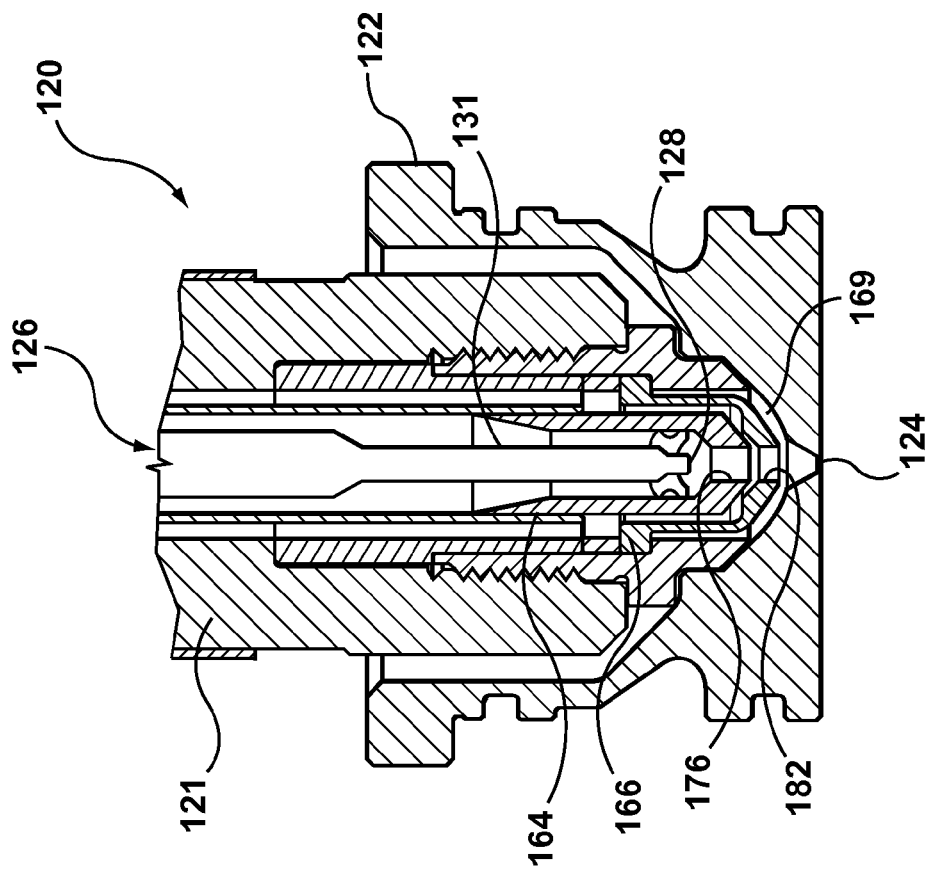
Figure 3B:
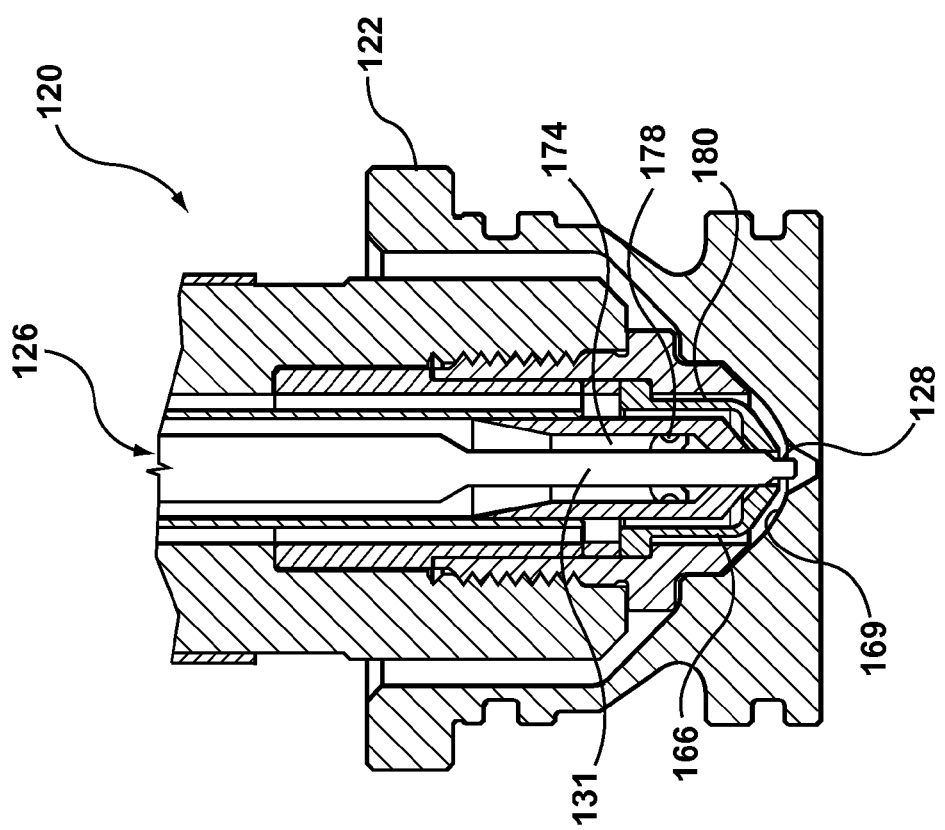
Figure 3D:
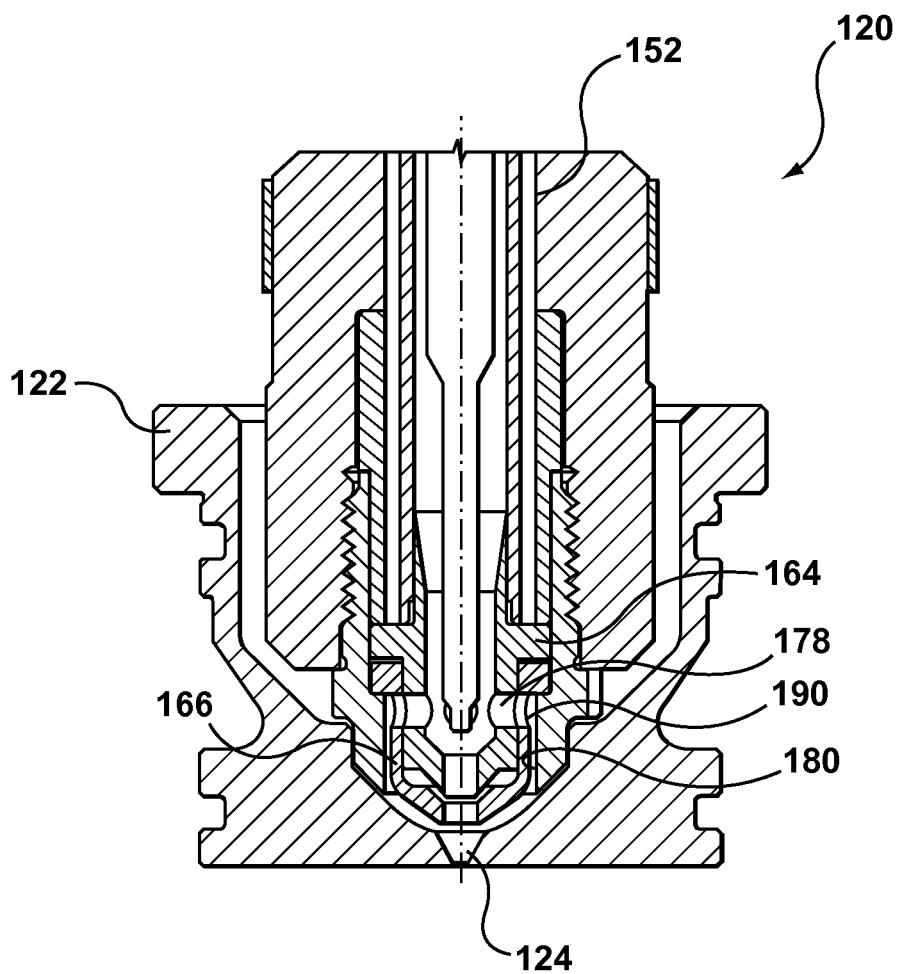
FIGS. 3D and 4D are sectional views taken along line Y-Y of FIG. 3 of the gate area of the nozzle showing the valve pin in the fully open position allowing the first layer flow, the second layer flow and the third layer flow through the gate.
Figure 4D:
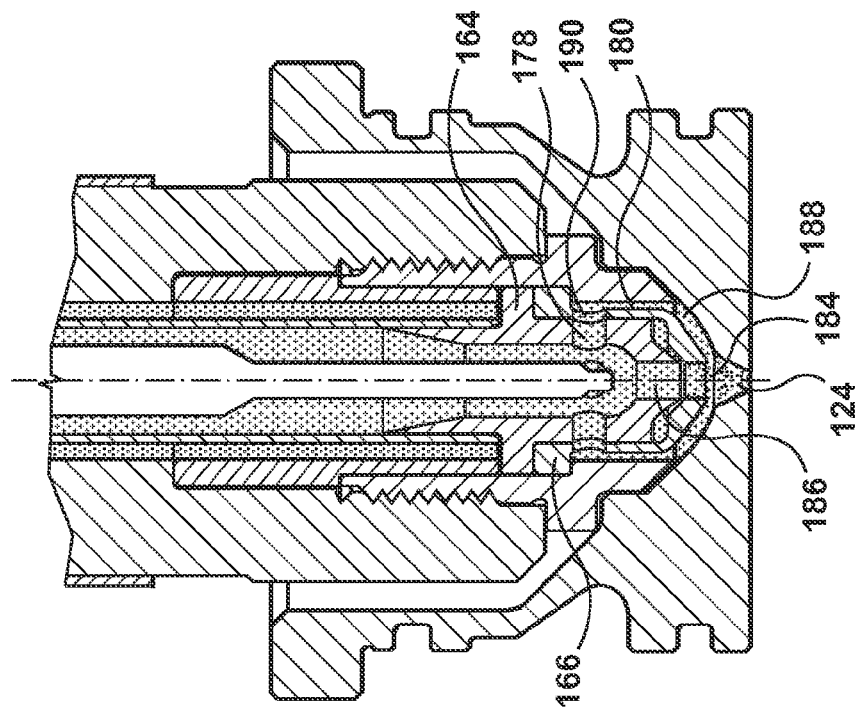

FIG. 3 is a top view of one of the nozzles 120 of FIG. 1 shown removed from coinjection apparatus 100, with FIGS. 3AA, 3A-3C and 4A-4C being sectional views of a nozzle tip and gate area of nozzle 120 taken along line X-X of FIG. 3 and wherein FIGS. 3D and 4D are sectional views of the nozzle tip and gate area of nozzle 120 taken along line Y-Y of FIG. 3. With reference to the enlarged view of the gate area shown in FIG. 3AA, nozzle tip 154 includes a first part, or tip base 162, a second part, or tip divider 164 and a third part, or tip cap 166 that are retained by a threaded tip retainer 168 within a threaded bore 170 in a downstream or front end of nozzle body 121. The retaining is assisted by a concave shoulder 119 in nozzle body 121 and a corresponding convex shoulder 161 on tip base 162 and by the shape of the contact areas 163, 165 between the corresponding surfaces of tip base 162 and tip cap 166 and tip retainer 168. Other coupling schemes, such as brazing, may also be used. Tip retainer 168 also includes a sealing portion 167 that fits or seals against gate insert 122 and prevents molding material from entering an insulating air space 171 therebetween. Downstream surfaces 175, 177 of tip cap 166 and tip retainer 168, respectively, are spaced from gate insert 122 by a gap or "bubble" area 169 within the gate area that surrounds gate 124.

Inner diameter $I_{D2}$ of sleeve 136 is sized to slide over an upstream segment 139 of tip divider 164 in order to fluidly communication skin material melt channel 150 and core material melt channel 152 of nozzle 120 with the corresponding melt passages within nozzle tip 154. More particularly, tip base 162 includes inner surface 160 that opposes outer surface 156 of sleeve 136 to define an upstream portion of a core material melt passage 172 and tip divider and tip cap 164, 166 define a downstream portion of core material melt passage 172. Core material melt passage 172 of nozzle tip 154 receives and directs the melt stream of core material from sleeve core material melt channel 152 through a central opening 182 that is formed through a downstream end of tip cap 166 to flow to gate 124. Tip divider 164 also defines a central skin material melt passage 174 within nozzle tip 154 that receives the melt stream from sleeve skin material melt channel 150 and splits the melt stream of skin material to form an outer layer and an inner layer flow of the skin material. The outer layer flow of the skin material enters a plurality of tunnel channels 178, each of which is created by adjacent axially aligned side bores provided for in tip divider 164 and tip cap 166, to exit into a nozzle tip outer layer melt passage 180 formed between an outer surface of tip cap 166 and an inner surface of tip retainer 168. Thereafter, a portion of the skin material is directed through outer layer melt passage 180 to gate 124. Each tunnel channel 178 may be considered laterally or radially extending in that it allows the molding material to flow sideways or outward relative to the general flow of molding material in central skin material melt passage 174. As well, tunnel channels 178 may be described to cross, or as crossing, the core material melt passage 172 and/or the core material melt stream that flows there through. Each tunnel channel 178 may be a bore, a slit, a hole, an opening, or any other type of channel structure through tip divider 164 and tip cap 166 that is suitable for connecting central skin material melt passage 174 and outer layer melt passage 180. The inner layer flow of the skin material exits nozzle tip 154 through a central opening or channel 176 that is formed through a downstream end of tip divider 164 and axially aligned central opening 182 of tip cap 166 to flow toward mold gate 124. Each of central openings 176, 182 is axially aligned with mold gate 124 such that valve pin 126 is slidingly disposed therethrough as discussed further below.

Tip portion 128 of valve pin 126 is shown in FIG. 3AA retracted or withdrawn from gate 124 and positioned within central opening 176 of tip divider 164 of nozzle tip 154. Tip divider central opening 176 is wider than valve pin tip portion 128 so that in such a position the flow of the skin material exits central skin material melt passage 174 through central opening 176, as described in more detail below with reference to FIGS. 3C, 4C, 3D and 4D.

FIGS. 3A, 3B, 3C and 3D show the same components and orientations of the valve pin in the nozzle tip and gate area as in corresponding colored FIGS. 4A, 4B, 4C and 4D, respectively, with FIGS. 4A, 4B, 4C and 4D depicting flow of the skin and core materials at each valve pin position. In FIGS. 3A and 4A, tip portion 128 of valve pin 126 is seated within gate 124 and tip guiding segment 131 of valve pin 126 is seated within central openings 176, 182 of tip divider 164 and tip cap 166 such that neither the skin or core material is able to flow into the mold cavity (not shown) from the core material melt passage 172, central skin material melt passage 174, or outer layer melt passage 180. As shown in FIG. 4A, the moldable skin material within skin material melt channel 150 will be split to form an outer layer melt flow 188 that exits central skin material melt passage 174 through tip diverter tunnel channels 178 to flow within outer layer melt passage 180 and bubble area 169 and an inner layer melt flow 186 within nozzle tip 154 that will exit central skin material melt passage 174 when second nozzle tip central opening 176 is unblocked. The moldable core material within outer melt channel 152 in FIG. 4A forms a core material melt flow 184 within nozzle tip core material melt channel 172 where it will flow to gate 124 when tip cap central opening 182 is unblocked.

In FIGS. 3B and 4B, tip portion 128 of valve pin 126 is in a retracted position unseated from gate 124 while nozzle tip guiding segment 131 of valve pin 126 remains seated within or blocking central openings 176, 182 of tip divider 164 and tip cap 166 such that only outer layer melt flow 188 of the skin material is permitted to flow into the melt cavity (not shown) via gate 124. Outer layer melt flow 188 travels from central skin material melt passage 174 to mold gate 124 via tip diverter tunnel channels 178, outer layer melt passage 180 and bubble area 169.

Figure 4C:
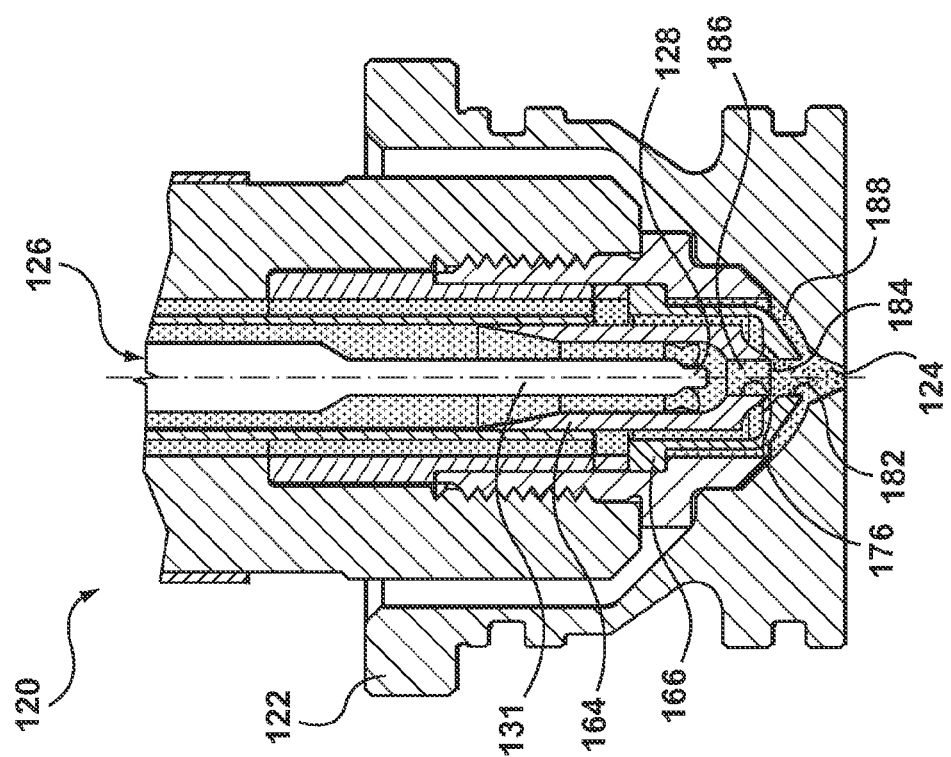

In FIGS. 3C and 4C, tip portion 128 of valve pin 126 is in a fully retracted position unseated from gate 124 with tip guiding segment 131 of valve pin 126 unseated or withdrawn from blocking both tip diverter central opening 176 and tip cap central opening 182. When valve pin tip portion 128 is fully retracted in this manner, inner layer melt flow 186 of the skin material and core material melt flow 184 are permitted to flow into the mold cavity (not shown) via gate 124 simultaneously with outer layer melt flow 188 of the skin material. Inner layer melt flow 186 flows from central skin material melt passage 174 through tip diverter central opening 176 to thereafter meet with core material melt flow 184 that is flowing from nozzle tip core material melt passage 172, such that the inner layer melt flow 186 and core layer melt flow 184 exit through central opening 182 of tip cap 166 with inner layer melt flow 186 located centrally within or essentially encircled by core layer melt flow 184. After exiting tip cap central opening 182 in such a manner, the inner layer melt flow 186 and core layer melt flow 184 meet with outer layer melt flow 188 of the skin material that is simultaneously flowing through bubble area 169 to gate 124. The substantially concentric inner layer melt flow 186 and core layer melt flow 184 are thereby substantially surrounded by the outer layer melt flow 188 as the three melt flows combine in bubble area 169 proximate the gate area of coinjection apparatus 100 and then simultaneously enter the mold cavity via gate 124. In this manner the components of nozzle tip 154 are able to position core layer melt flow 184 between outer and inner layer melt flows 188, 186 of the skin material as the three melt flows simultaneously flow through bubble area 169 and enter gate 124. As such, coinjection apparatus 100 is capable of forming a molded article that includes an inner and outer layer of the first or skin material with a middle layer of the core material through simultaneous injection of the skin and barrier materials, which permits faster cycle times and also facilitates thin-walled molding applications.

Accordingly, in accordance with embodiments hereof valve pin 126 of coinjection apparatus 100 is actuated to have a double stroke and to thereby create in conjunction with nozzle tip 154 a three melt flow pattern at gate 124 by dividing one of two incoming melt streams into two separate melt flows. In a method in accordance with an embodiment hereof, a first stroke of valve pin 126 unseats valve pin tip portion 128 from gate 124 to allow a skin material, such as polypropylene (PP), to create a first layer flow of PP at gate 124 while valve pin tip guiding segment 131 is blocking the flow of a core material layer such as for example, a barrier material, such as ethylene vinyl alcohol polymer (EVOH), from flowing through nozzle tip core material melt passage 172. A second stroke of valve pin 126 retracts valve pin tip portion 128 to upstream of nozzle tip core material melt passage 172 to create a barrier layer flow of EVOH and also upstream of central opening 176 of tip divider 164 to create an inner layer flow of PP. In the manner as described above, the second layer of EVOH exits core material melt passage 172 so as to be positioned between the outer and inner layers of PP within gate 124.

In accordance with an embodiment hereof a stroke distance of valve pin 126 may be adjusted in order to control a position of a core layer of a barrier material relative to the inner and outer layers of a skin material in a molded article. When valve pin 126 is positioned as shown in FIG. 3AA, tip portion 128 projects within central opening 176 of tip divider 164 causing a slight throttling or restriction of inner layer melt flow 186 of the skin material through central opening 176. Such a restriction of the flow of the inner layer of skin material through central opening 176 results in an increase in the skin material being directed as outer layer melt flow 188 through outer layer melt passage 180 and bubble area 169. By increasing a volume of the skin material directed through outer layer melt passage 180 and bubble area 169 to gate 124 relative to a volume of the skin material directed through central opening 176 to gate 124, the barrier layer of melt flow 184 will be moved inward by the greater volume of outer layer melt flow 188 toward inner layer melt flow 186. As such in the resulting molded article, a core layer of the barrier material will be positioned between inner and outer layers of the skin material closer to an inner surface of the molded article. Conversely, when valve pin 126 is positioned as shown in FIGS. 3C, 3D, 4C, 4D or at an even greater upstream retracted position, central opening 176 of tip divider 164 is wide open to allow inner layer melt flow 186 of the skin material to freely flow through central opening 176, which results in an increase in the skin material being directed as inner layer melt flow 186 as compared to the skin material being directed as outer layer melt flow 188 through outer layer melt passage 180 and bubble area 169. By increasing a volume of the skin material directed through central opening 176 to gate 124 relative to a volume of the skin material directed through outer layer melt passage 180 and bubble area 169 to gate 124, the core material melt flow 184 of the barrier material will be moved outward by the greater volume of second melt flow 186 toward outer layer melt flow 188. As such in the resulting molded article, a core layer of the barrier material will be positioned between inner and outer layers of the skin material closer to an outer surface of the molded article.

During operation, an operator or automated inspection device may inspect a newly molded article for core layer position relative to inner and outer layers of skin material. If the core layer of the molded article is found to be positioned in an unsatisfactory or undesirable manner, the operator may then instruct an e-drive of actuation mechanism 132 to adjust a retracted position of valve pin 126 to change the barrier layer position relative to the inner and outer layers of the skin material in a manner as described in the preceding paragraph.

FIGS. 3D and 4D are sectional views of the nozzle tip and gate area of nozzle 120 taken along line Y-Y of FIG. 3 with valve pin tip portion 128 in the fully retracted position as shown in FIGS. 3C and 4C. In FIGS. 3D and 4D, each tunnel channel 178 of tip divider 164 is shown to be in fluid communication with outer layer melt passage 180 of nozzle tip 154 via a respective side wall opening 190 in tip cap 166. In an embodiment, tip diverter 164 and tip cap 166 may be brazed together along their contacting surfaces shown in FIGS. 3D and 4D so that alignment of tunnel channels 178 of tip divider 164 and respective side wall openings 190 in tip cap 166 are maintained.

It would be understood by one of skill in the art with reference to FIG. 3AA as compared to FIG. 3D that tip divider 164 also includes longitudinal bores 192 that make-up an upstream portion of core material melt passage 172 for receiving the melt stream of the core material from sleeve core material melt channel 152. In the current embodiment, the adjacent bores within tip divider 164 and tip cap 166 create four tunnel channels 178 radially spaced at 90 degrees to each other and four longitudinal bores 192 extend through tip divider 166 between tunnel channels 178 to permit a flow of the core material melt stream there around. In this manner, tunnel channels 178 may be described to cross, or as crossing, the core material melt passage 172 and/or the core material melt stream 184 that flows there through.

Figure 5:
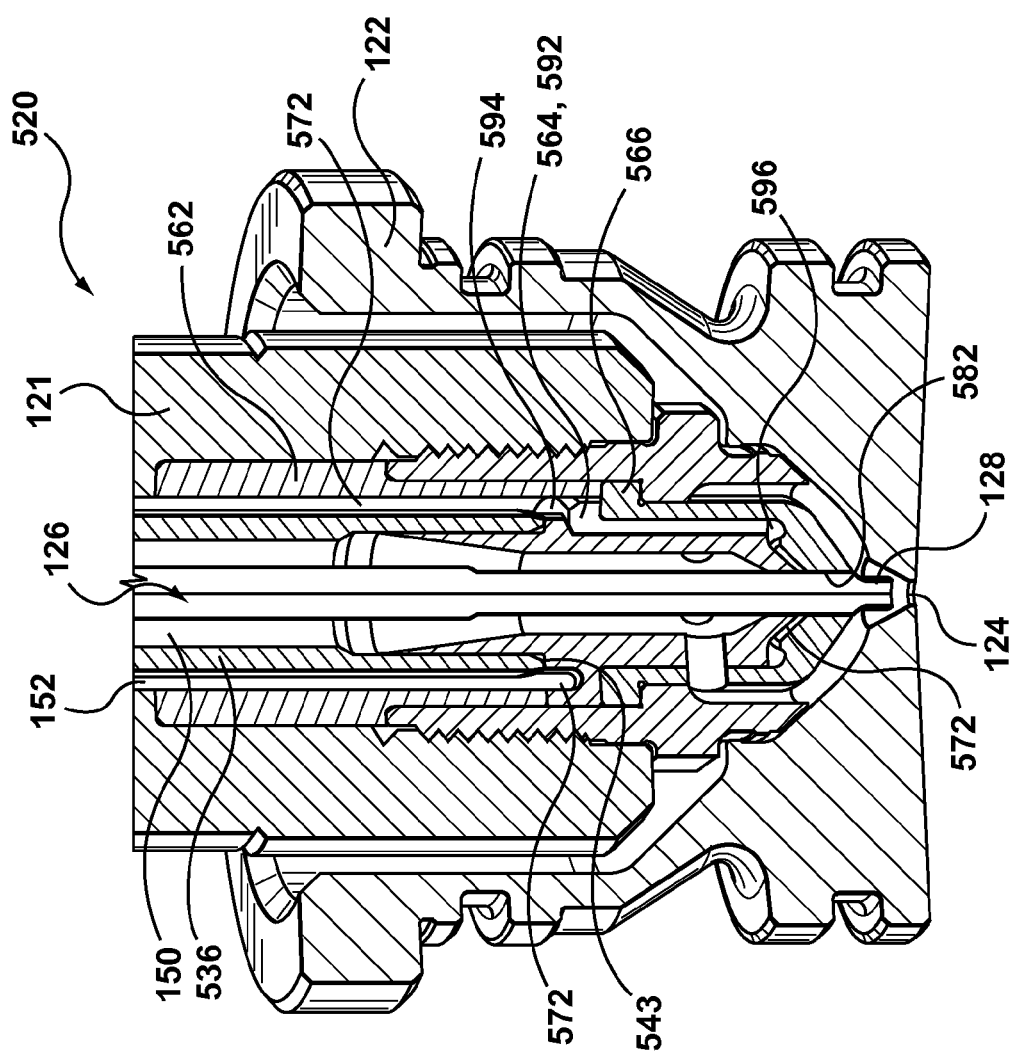
FIG. 5 is an enlarged sectional view of a gate area of a nozzle in accordance with another embodiment hereof.

FIG. 5 is an enlarged sectional view of a gate area of nozzle 520 in accordance with another embodiment hereof. The same reference numbers are used for features of nozzle 520 that remain unchanged from nozzle 120 described above and as such those features are not further described. An upstream portion of core material melt passage 572 that is defined between sleeve 536 and nozzle tip base 562 is enlarged proximate downstream end 543 of sleeve 536 and in conjunction with an enlarged upstream area of a downstream portion of core material melt passage 572 proximate thereto forms an annular decompression chamber or area 594 into which the melt stream of core material flows prior to entering longitudinal bores 592 of nozzle tip diverter 564. In a similar manner, an annular decompression chamber 596 is formed by an enlargement of the downstream portion of the core material melt passage 572, which is made by removing material from at least one of nozzle tip cap 566 and nozzle tip diverter 564, at the location where the melt stream exits longitudinal bores 592 of nozzle tip diverter 564. The melt stream directed through longitudinal bores 592 of nozzle tip diverter 564 recombines within annular decompression chamber 596 and then flows through the remainder of core material melt passage 572 that angles the core material melt stream toward central opening 582 of nozzle tip cap 566 on its way to gate 124.

Figure 6:
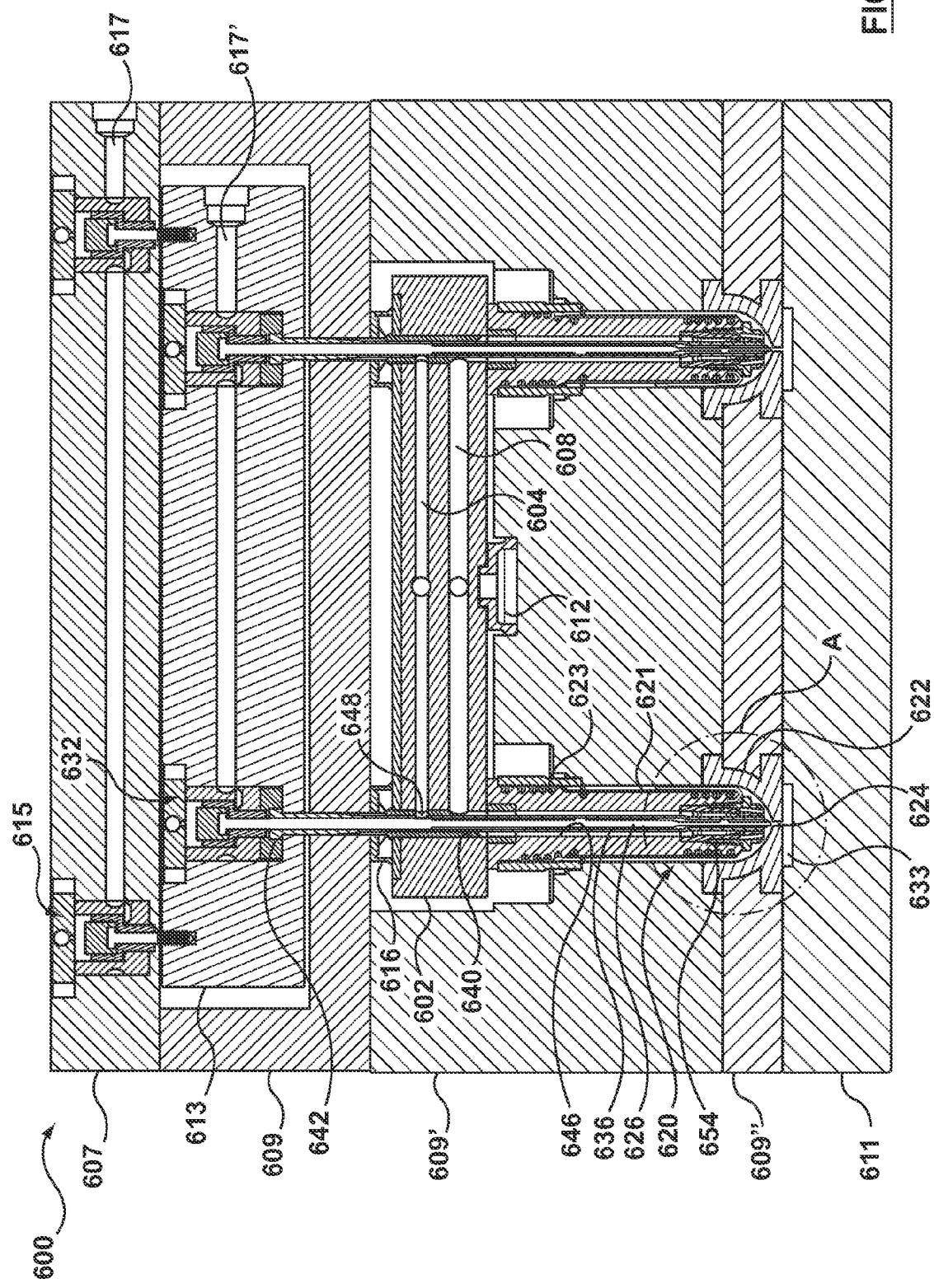
FIG. 6 is a sectional view of a coinjection hot runner injection molding system in accordance with another embodiment hereof.
Figure 6A:
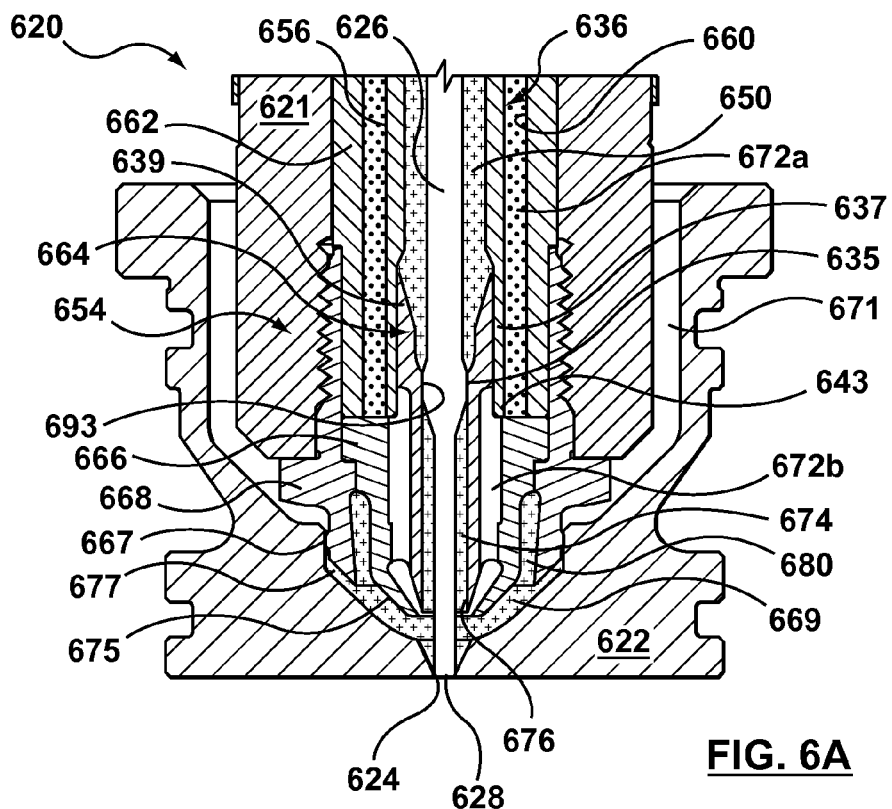
Figure 6B:
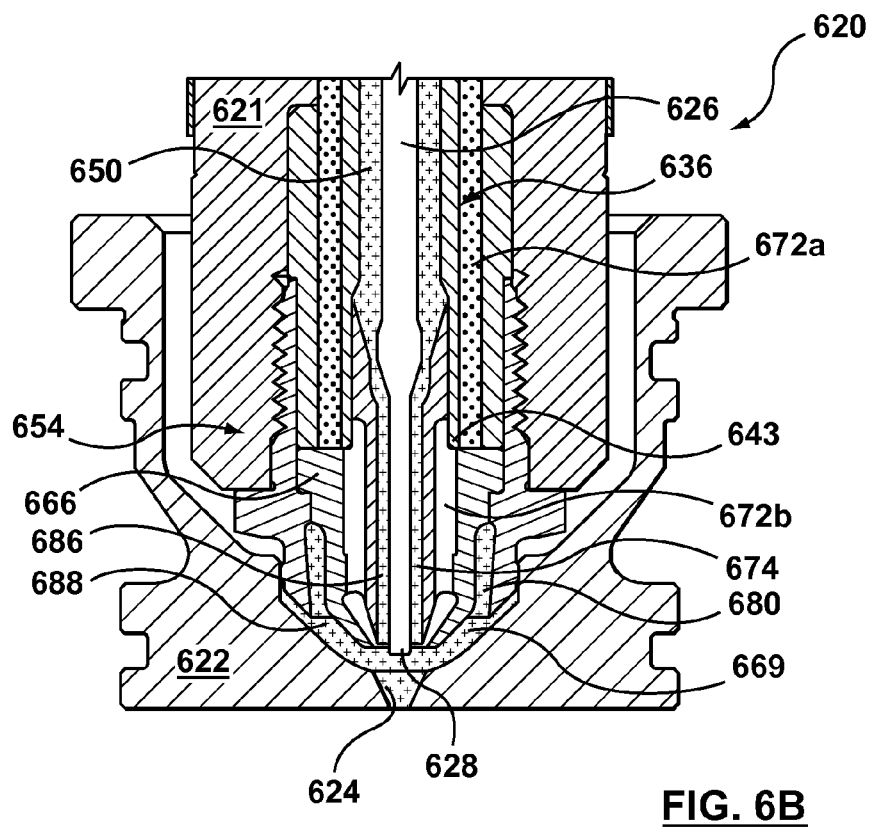
Figure 6C:
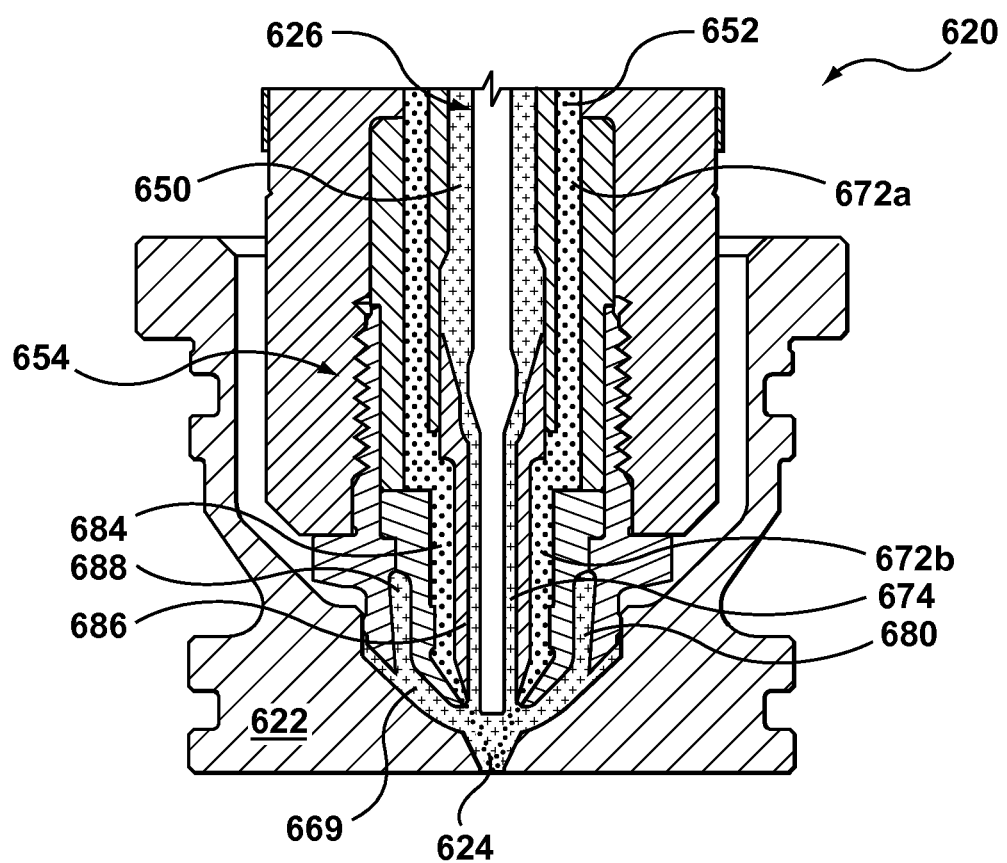
Figure 7A:
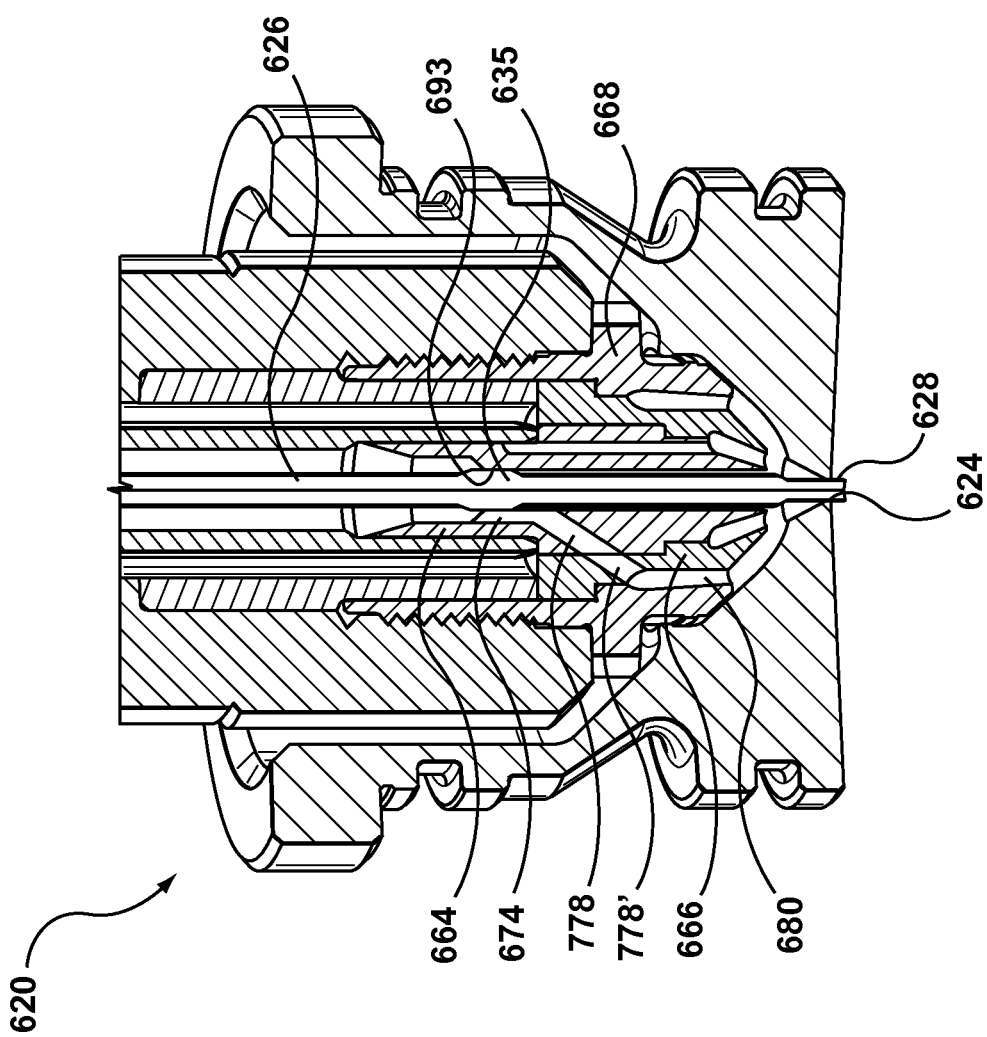
Figure 7C:
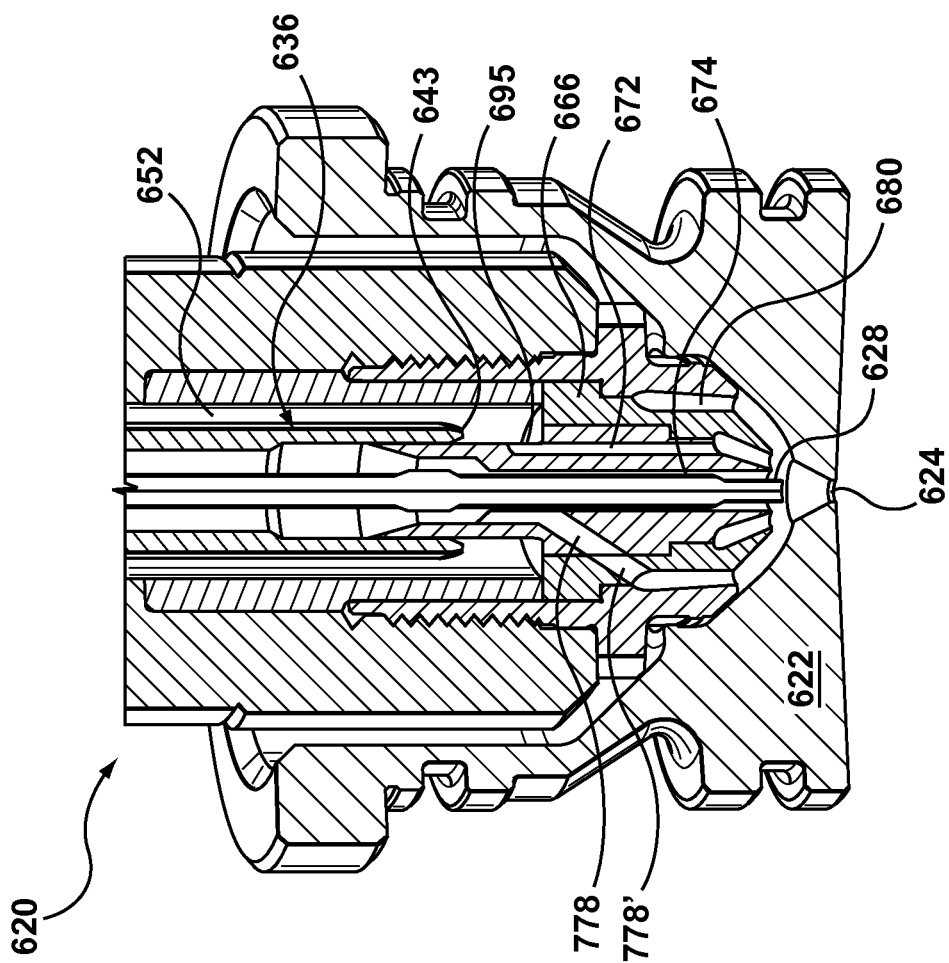

FIG. 6 depicts a sectional view of a hot runner coinjection apparatus 600 in accordance with another embodiment hereof. Features and aspects of the other embodiments may be used accordingly with the current embodiment. FIGS. 6A-6C and FIGS. 7A-7C are enlarged sectional views of gate area A depicted in FIG. 6, with FIGS. 6A and 7A showing a valve pin and a sleeve in a closed position, with FIGS. 6B and 7B showing the valve pin in an open or retracted position allowing flow of an inner layer and outer layer of a first moldable material through a mold gate and with FIGS. 6C and 7C showing a sleeve as well as the valve pin in an open or retracted position allowing a middle layer of a second moldable material to flow through the gate between the inner and outer layers of the first moldable material.

With reference to FIG. 6, coinjection apparatus 600 includes a backing plate 607, various mold plates 609, 609', 609", a cavity plate 611, a yoke plate 613, and a manifold 602. Cavity plate 611, which is illustrated in simplified form for ease of illustration, partially defines a plurality of mold cavity 633. Yoke plate 613 is surrounded by mold plate 609 and backing plate 607. Manifold 602 is located within cooled mold plates 609, 609' surrounded by an insulative air gap that is maintained by a locating ring 612 and valve discs 616. Coinjection apparatus 600 further includes hot runner nozzles 620, each corresponding to a mold gate 624 defined by a respective mold gate insert 622, which is disposed within mold plates 609', 609". Although a gate area and mold gate 624 of coinjection apparatus 600 is formed by mold gate insert 622, this is by way of illustration rather than limitation as one of skill in the art would recognize that the gate area may defined instead by one or more other injection molding structure(s), such as a mold gate and gate area defined in a mold cavity plate, without departing from the scope of the present invention.

Each nozzle 620 is adapted to receive a longitudinally slidable sleeve 636 and a valve pin 626 (not hatched in the figure). Disposed in yoke plate 613 are valve pin actuators 632, each for actuating a respective valve pin 626 of the respective nozzle 620. Disposed in backing plate 607 are yoke plate actuators 615 for actuating yoke plate 613, in which upstream heads 642 of slidable sleeves 636 are fixed. Backing plate 607 includes at least one fluid channel 617 for feeding the attached yoke plate actuators 615, and yoke plate 613 includes at least one fluid channel 617' for feeding the attached valve pin actuators 632.

Manifold 602 includes a first set of runners or melt channels 604 for receiving a first melt stream of a moldable skin material from a first melt source (not shown) via a first melt inlet or sprue (not shown) and having a second set of runners or melt channels 608 for receiving a second melt stream of a moldable core material from a second melt source (not shown) via a second melt inlet or sprue (not shown). The first and second set of manifold runners 604, 608 are independent and do not communicate with each other, such that the first and second melt streams do not combine in manifold 602. The lengths, diameters or widths, and general geometry of the first and second set of manifold runners 604, 608 depend on the specific application and the amounts and natures of the first and second moldable materials. Manifold 602 is provided with a heater (not shown) to maintain the temperature of the first and second melt streams of the respective first and second moldable materials. In an embodiment, the skin material of the first melt stream is a main or surface material for molding an inner and outer layer of a molded article, such as a cap for a plastic bottle, with the core material of the second melt stream being a barrier material for molding a middle, barrier, or filler layer between the inner and outer layers of the molded article.

Each valve-gated nozzle 620 includes, inter alia, a nozzle body 621, a nozzle heater 623, a nozzle tip 654, which is described in detail below, and other components as would be known to one of ordinary skill in the art. Nozzle body 621 is generally cylindrical and includes a longitudinal bore 646, which is also generally cylindrical. The longitudinal bore 646 of each nozzle 620 is aligned with a longitudinal bore 640 of manifold 602. Actuatable valve pin 626 slidably extends through bores 640, 646 of manifold 602 and nozzle 620, respectively, with a tip portion 628 of valve pin 626 sized to be seated within mold gate 624. Similar to valve pin 126, valve pin 626 may include segments of reduced diameter as it extends from valve pin actuator 632 to tip portion 628 thereof. As shown in FIG. 6A, valve pin 626 includes an enlarged diameter area 635 that ride against alignment fins 693 that project from an inner surface of a tip divider 664 of nozzle tip 654, as described below, for aligning valve pin tip portion 628 with mold gate 624.

Sleeve 636 is slidably disposed within bores 640, 646 of manifold 602 and nozzle 620, and a bore 660 of nozzle tip 654. Sleeve 636 is a hollow tubular structure that defines a skin material melt channel 650 and forms an annular core material melt channel 652 between an outer surface 656 thereof and bores 640, 646 of manifold 602 and nozzle 620, respectively, and an upstream portion of an annular core material melt passage 672a between outer surface 656 and bore 660 of nozzle tip 654, in a manner as similarly described with reference to sleeve 136. Skin material melt channel 650 communicates with the first set of runners 604 of manifold 602 via a longitudinally extending slot 648 in an upstream portion of sleeve 636, similar to side opening 148 of sleeve 136, and core material melt channel 652 communicates with the second set of runners 608 of manifold 602. Slot 648 is sized and oriented with respect to the first set of runners 604 to permit melt flow to continue to skin material melt channel 650 when sleeve 636 is positioned in or actuated between a retracted upstream position and an extended downstream position. In an embodiment, valve pin 626 may include an outer diameter in an upstream segment thereof that is sized to block slot 648 of sleeve 636 to enable shut-off of the melt stream from the first set of runners 604 of manifold 602 in a manner as described in U.S. Pat. No. 7,527,490 to Fairy, which is incorporated by reference herein in its entirety.

With reference to FIGS. 6A-6C and 7A-7C, nozzle tip 654 includes a tip base 662, tip divider 664 and a tip cap 666 that are retained by a threaded tip retainer 668 within a threaded bore in a downstream or front end of nozzle body 621. The retaining is assisted by a concave shoulder in nozzle body 621 and a corresponding convex shoulder on tip base 662 and by the shape of the contact areas between the corresponding surfaces of tip base 662 and tip cap 666 and tip retainer 668 in a manner as previously described with reference to the components of nozzle tip 154. Other coupling schemes, such as brazing, may also be used. Tip retainer 668 also includes a sealing portion 667 that fits or seals against gate insert 622 and prevents molding material from entering an insulating air space 671 therebetween. Downstream surfaces 675, 677 of tip cap 666 and tip retainer 668, respectively, are spaced from gate insert 622 by a gap or "bubble" area 669 that surrounds gate 624.

Tip base 662 has an inner surface 660 that opposes outer surface 656 of sleeve 636 to define the upstream portion of core material melt passage 672a and tip divider and tip cap 664, 666 define a downstream portion of core material melt passage 672b. The upstream and downstream portions of core material melt passage 672a, 672b of nozzle tip 654 receive and direct a melt stream of core material from core material melt channel 652 to gate 624 when sleeve 636 is retracted as described below. Tip divider 664 also defines a nozzle tip skin material melt passage 674 that receives a melt stream of a skin layer material from skin material melt channel 650 and splits the melt stream to form a first outer layer flow and a second inner layer flow of the skin material. With reference to FIG. 7A, the outer layer flow of the skin material exits skin material melt passage 674 through tunnel channels or openings 778, 778' of tip divider and tip cap 664, 666, respectively, to enter a nozzle tip outer layer melt passage 680 formed between an outer surface of tip cap 666 and an inner surface of tip retainer 668 through which the outer layer flow is directed to gate 624. Each tunnel channel 778, 778' may be considered laterally or radially extending in that it allows the molding material to flow sideways or at an acute angle relative to the general flow of skin layer material in nozzle tip skin material melt passage 674. Each tunnel channel 778, 778' may be a bore, a slit, a hole, an opening, or any other type of channel structure. The inner layer flow of the skin material exits skin material melt passage 674 through a central opening or channel 676 of tip divider 664 to flow toward gate 624.

Sleeve 636 has a downstream end 643 that opens and closes an aperture 695 for melt communication of upstream portion of core material melt passage 672a with downstream portion of core material melt passage 672b and mold gate 624, such that sleeve 636 may be considered to have an open, retracted position and a closed, forward position. An inner diameter of a downstream segment 637 of sleeve 636 is sized to slide over an outer surface of an upstream segment 639 of tip divider 664 as sleeve 636 is moved between the open and closed positions.

With reference to FIGS. 6A-6C, skin material that forms an inner layer flow 686 and an outer layer flow 688 is depicted by a series of plus signs, i.e., "+", and core material that forms a core layer melt flow 684 is depicted by a series of dots, i.e., "•". In FIGS. 6A and 7A, tip portion 628 of valve pin 626 is seated within gate 624 and downstream end 643 of sleeve 636 sits against tip cap 666 to block downstream portion of core material melt passage 672b such that no melt flows into melt cavity 640 from the nozzle tip skin, core material, or outer layer melt passages 674, 672b, 680. In FIGS. 6B and 7B, tip portion 628 of valve pin 226 is in a retracted position unseated from gate 624 while downstream end 643 of sleeve 636 remains blocking downstream portion of core material melt passage 672b such that only inner and outer layer melt flows 686, 688 of the skin material are permitted to flow into melt cavity 640 via gate 624. The outer layer melt flow 688 travels from skin material melt passage 674 to gate 624 via tunnel channels 678, 678', outer layer melt passage 680 and bubble area 669.

In FIGS. 6C and 7C, tip portion 628 of valve pin 626 is unseated from gate 624 with downstream end 643 of sleeve 636 retracted or withdrawn from blocking downstream portion of core material melt passage 672b such that inner and outer layer melt flows 686, 688 of the skin material are permitted to flow into the melt cavity 633 via gate 124 along with the core layer melt flow 684 of the core or barrier material. In FIG. 6C, moldable material within skin material melt channel 650 splits to form outer layer melt flow 688 that exits skin material melt passage 674 through tunnel channels 778, 778' to flow within outer melt passage 680 and bubble area 669 to gate 624 and to form inner layer melt flow 686 that flows through skin material melt passage 674 to gate 624. In an embodiment, valve pin 626 may be incrementally advanced or retracted as the inner and outer layer melt flows of the skin material are flowing to the mold cavity to selectively change the flow of the skin material. The core material in FIG. 6C provided to upstream portion of core melt passage 672a provides a core layer melt flow 684 that flows through downstream portion of core material melt passage 672b to gate 624 when aperture 695 there between is open. In this manner the components of nozzle tip 654 are able to position core layer melt flow 684 of the core material between inner and outer layer melt flows 686, 688 of the skin material as the three melt flows simultaneously flow through bubble area 669 and enter gate 624. As such, coinjection apparatus 600 is capable of forming a molded article that includes an inner and outer layer of the first or skin material with a core layer of the second or core material through simultaneous injection of the skin and core materials, which may permit faster cycle times and also facilitates thin-walled molding applications.

Figure 8:
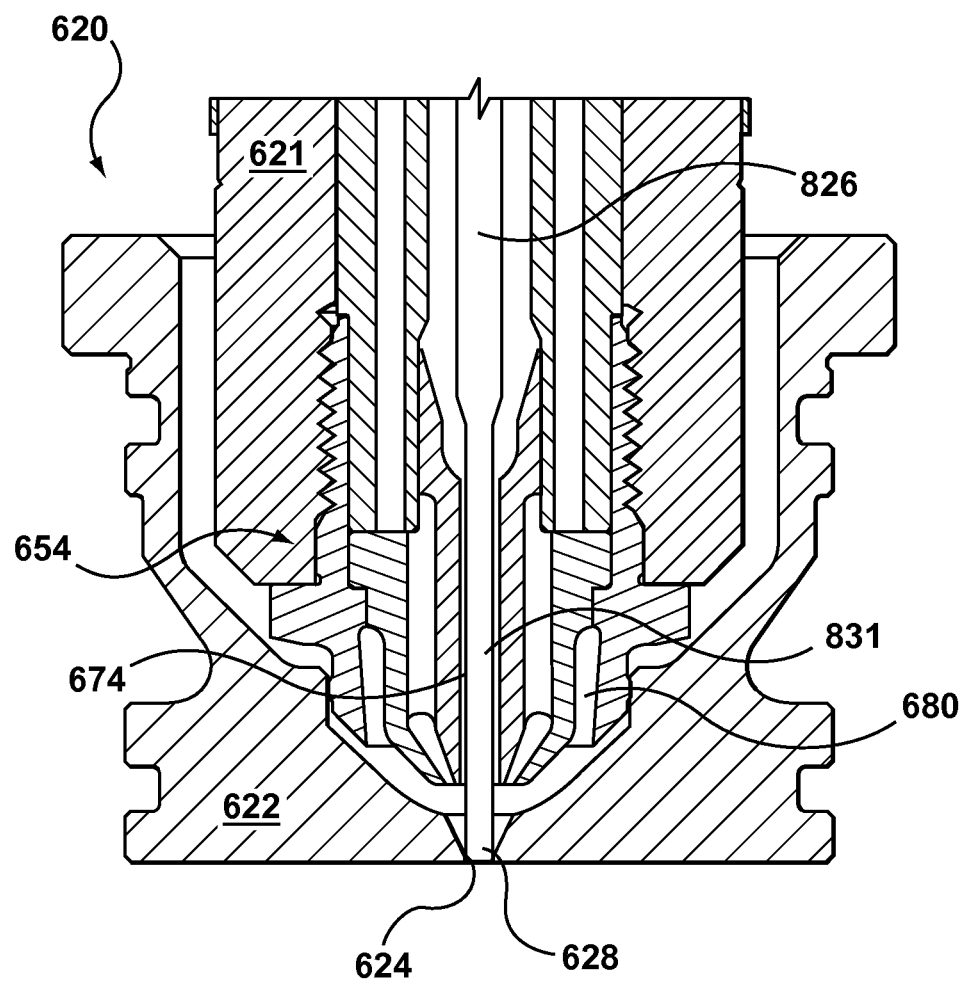
FIG. 8 is enlarged sectional view of gate area A depicted in FIG. 6 in accordance with another embodiment hereof.

FIG. 8 is enlarged sectional view of gate area A depicted in FIG. 6 in accordance with another embodiment hereof. All features shown in the embodiment of FIG. 8 are the same as those described in the preceding embodiment except that valve pin 826 includes a downstream segment 831 that has a larger diameter. The larger diameter of valve pin downstream segment 831 reduces the volume of the inner layer melt flow of the skin material that flows through nozzle tip skin material melt passage 674 to thereby increase the volume or balance the outer layer melt flow of the skin material that flows through nozzle tip outer melt passage 680.

Although the retractable sleeve coinjection apparatus of FIGS. 6 and 8 are described as running simultaneous molding applications, in other embodiments in accordance herewith the apparatus may also be operated to run sequential molding applications. More particularly, valve pin 626 may be retracted as shown in FIGS. 6B and 7B such that only the inner and outer layer melt flows of the skin material are permitted to flow into melt cavity 640 via gate 624. The source of the skin material being provided for forming inner and outer layer melt flows is than stopped with downstream end 643 of sleeve 636 retracted from blocking downstream portion of core material melt passage 672b to be positioned as shown in FIGS. 6C and 7C, such that only the core layer melt flow of the core material is permitted to flow into melt cavity 640 via gate 624. Thereafter, downstream end 643 of sleeve 636 is advanced to once again block downstream portion of core material melt passage 672b to stop the core layer melt flow thereto and the inner and outer layer melt flows of the skin material are again permitted to flow into melt cavity 640 via gate 624.

Figure 9:
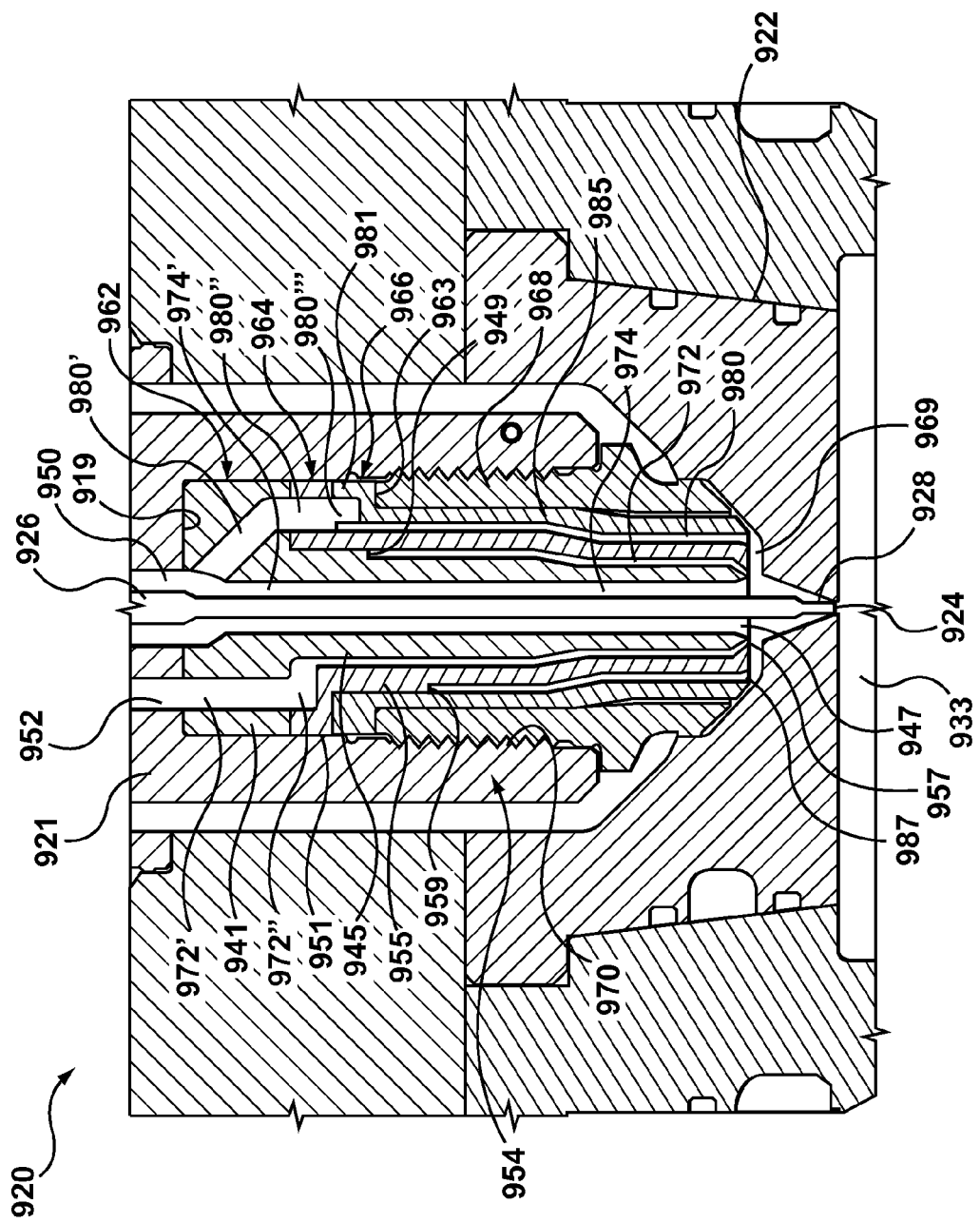
FIG. 9 is an enlarged sectional view of a gate area of a nozzle in accordance with another embodiment hereof.

FIG. 9 is an enlarged sectional view of a gate area of a valve-gated nozzle 920 in accordance with another embodiment hereof. Nozzle 920 includes, inter alia, a nozzle body 921 that defines first and second melt channels 950, 952, a nozzle tip 954, and other components, such as a heater and a thermocouple, as would be known to one of ordinary skill in the art. First melt channel 950 of nozzle 920 receives a first melt stream of a moldable skin material from a first melt source via various hot runner components (not shown) and second melt channel 952 of nozzle 920 receives a second melt stream of a moldable second material from a second melt source via various hot runner components (not shown).

Nozzle tip 954 includes a first part 962, second part 964 and a third part 966 that are retained by a threaded tip retainer 968 within a threaded bore 970 in a downstream or front end of nozzle body 921. Each of nozzle tip first, second and third parts 962, 964, 966 includes a flanged upstream end with a generally tubular extension, which are sized to stack together to define various nozzle tip melt passages therebetween. More particularly, nozzle tip first part 962 has flanged end 941 and tubular extension 945, nozzle tip second part 964 has flanged end 951 and tubular extension 955 and nozzle tip third part 966 has flanged end 981 and tubular extension 985. Flanged ends 941, 951, 981 are generally of equal outer diameters and stack one on top of the other to be held against concave shoulder 919 of nozzle body 921 by tip retainer 968 that acts against contact area 963 of flanged end 981. Flanged end 941 of nozzle tip first part 962 defines first upstream segments 974', 972', 980' of central, middle and outer melt passages 974, 972, 980, flanged end 951 of nozzle tip second part 964 defines second upstream segments 972", 980" of middle and outer melt passages 972, 980, and flanged end 981 of nozzle tip third part 966 defines third upstream segment 980'" of outer melt passage 980. First upstream segments 974', 980' and second and third upstream segments 980", 980'" are in fluid communication with first melt channel 950 of nozzle 920 to split the first melt stream received therefrom into an inner and outer layer melt flow. First and second upstream segments 972', 972" are in fluid communication with second melt channel 952 of nozzle 920 to receive the second melt stream therefrom that becomes a middle layer melt flow as it passes through the remainder of nozzle tip 954.

Tubular extensions 945, 955, 985 of nozzle tip first, second and third parts 962, 964, 966 are generally of increased outer diameters to concentrically fit within one and other and define nozzle tip melt passages 972, 980 between corresponding surfaces thereof. More particularly, tubular extension 945 of first part 962 is sized to fit within tubular extension 955 of second part 964 to define middle melt passage 972 therebetween. Tubular extension 945 includes a shoulder 949 in an outer surface thereof which is in fluid communication with first and second upstream segments 972', 972" to direct the middle layer melt flow of the second material downstream into middle melt passage 972. Shoulder 949 encircles tubular extension 945 and is on a plane that is at an acute angle with respect to a longitudinal axis of first part 962 to be positioned to receive the middle layer melt flow from second upstream segment 972" at a most upstream point of shoulder 949 and direct the melt flow downstream along a wall of shoulder 949 into middle melt passage 972. Tubular extension 945 of nozzle tip first part 962 also defines central melt passage 974 through which valve pin 926 slidably extends, which is in fluid communication with first upstream segment 974' to receive the inner layer melt flow of the skin material therefrom. Tubular extension 955 of second part 964 is sized to fit within tubular extension 985 of third part 966 to define outer melt passage 980 therebetween. Similar to tubular extension 945, tubular extension 955 includes a shoulder 959 in an outer surface, which is in fluid communication with first, second and third upstream segments 980', 980", 980'" to direct the outer layer melt flow of the skin material into outer melt passage 980. Shoulder 959 encircles tubular extension 955 and is on a plane that is at an acute angle with respect to a longitudinal axis of first part 962 to be positioned to receive the outer layer melt flow from third upstream segment 980'" at a most upstream point of shoulder 959 and direct the melt flow downstream along a wall of shoulder 959 into outer melt passage 980.

Each of central, middle and outer melt passages 974, 972, 980 of nozzle tip 954 has an annular outlet 947, 957, 987, respectively, that directs the melt flows therefrom into bubble area 969 such that the middle layer melt flow from middle melt passage 972 is positioned between the inner and outer layer melt flows from inner and outer melt passages 974, 980, respectively. Annular outlet 957 of middle melt passage 972 is slightly angled toward central melt channel 974 to aid in preventing "bleeding" of the second or barrier material when the second material melt stream is stopped during an injection cycle. More particularly, the inner layer material that exits central melt channel 974 through annular outlet 947 may act to shear-off the middle layer material at annular outlet 957 when the second material melt stream is stopped during the injection cycle to prevent the middle layer material from continuing to enter the inner and outer melt flows.

In FIG. 9, valve pin 926 has tip portion 928 seated with mold gate 924 of gate insert 922 to close the mold gate such that no melt flows therethrough. When valve pin tip portion 928 is retracted or unseated from mold gate 924 and each of the first and second melt streams are being injected, the inner, middle and outer layer melt flows exiting central, middle and outer melt passages 974, 972, 980 of nozzle tip 954 via annular outlets 947, 957, 987, respectively, combine within bubble area 969 in a gate area of the coinjection apparatus to simultaneously flow through mold gate 924 into the mold cavity 933 and form a three layer molded article as similarly described above with reference to the previous embodiments. It would be understood by one of ordinary skill in the art that valve pin 926 may be actuated between the open, retracted and closed, seated positions in a conventional manner, such as by modifying the operation of the valve pin actuation system shown in the embodiment of FIG. 1.

Figure 10:
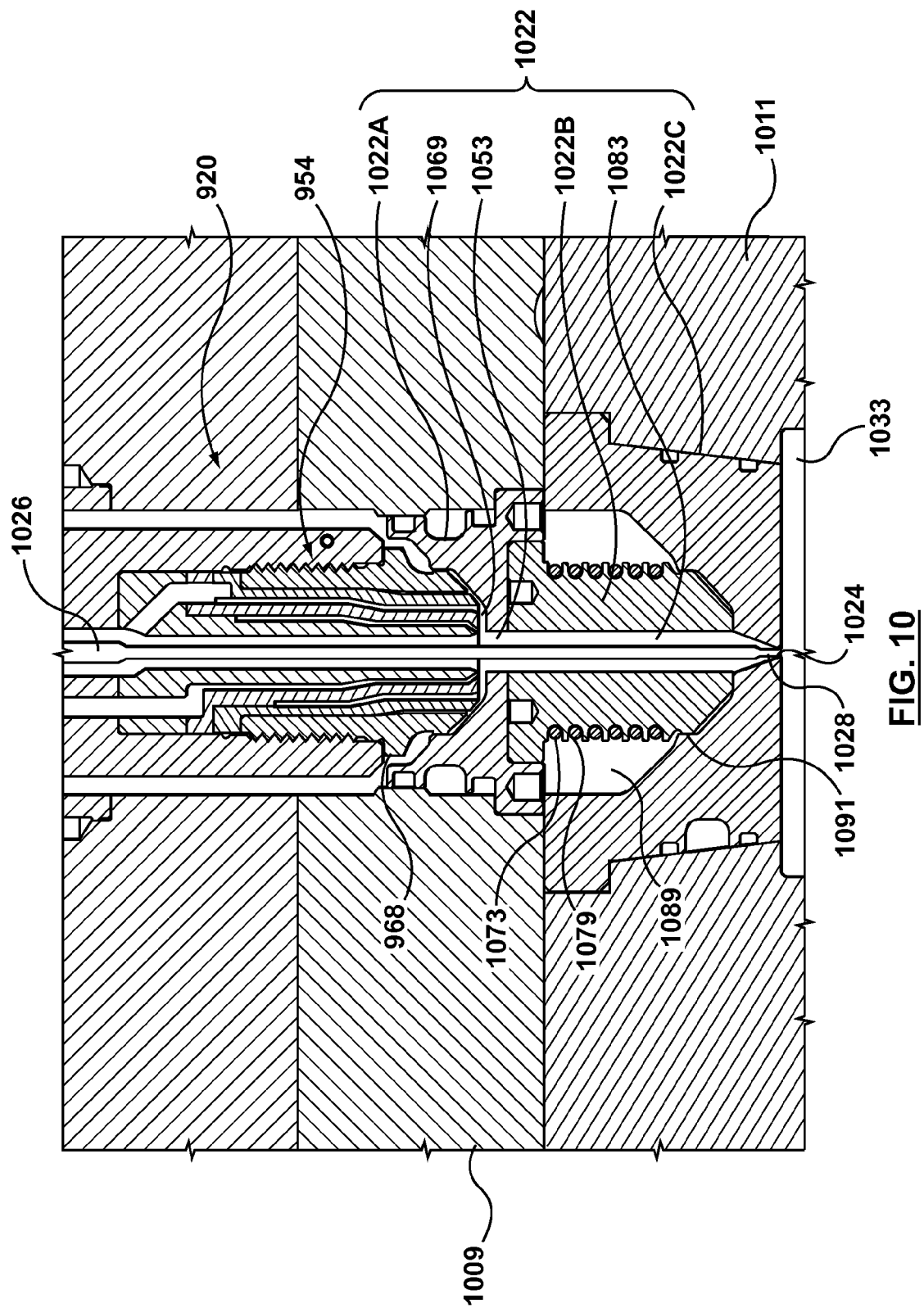
FIG. 10 depicts the nozzle of FIG. 9 in a gate area in accordance with another embodiment hereof.

FIG. 10 depicts nozzle 920 of FIG. 9 in a gate area in accordance with another embodiment hereof. Nozzle 920 includes nozzle tip 954 that delivers the inner, middle and outer layer melt flows into bubble area 1069 in a manner as previously discussed above with reference to delivery of the inner, middle and outer layer melt flows to bubble area 969. In the embodiment of FIG. 10, a three-piece heated mold gate insert 1022 is utilized to deliver the combined melt flows from bubble area 1069 to mold cavity 1033 via mold gate 1024. More particularly, a first mold gate part 1022A receives the downstream end of nozzle tip 954 therein such that tip retainer 968 seals against an inner surface of first mold gate part 1022A and defines bubble area 1069 therebetween that receives the inner, middle and outer layer melt flows exiting central, middle and outer melt passages 974, 972, 980 of nozzle tip 954 via annular outlets 947, 957, 987, respectively. An outlet 1053 of first mold gate part 1022A feeds the combined inner, middle and outer layer melt flows through a melt passage 1083 of a second mold gate part 1022B that is heated by heating element 1073 that sits within a groove 1079 in an outer surface thereof. Heated second mold gate part 1022B permits manipulation of a temperature of the combined inner, middle and outer layer melt flows as they flow through melt passage 1083, which may be desirable in certain molding applications. In an embodiment hereof, the temperature of the second mold gate part 1022B may be reduced relative to the temperature of nozzle 920 to increase a back pressure in the nozzle, which may help stabilize the newly combined melt flows. In another embodiment, the temperature of the second mold gate part 1022B may be increased relative to the temperature of nozzle 920, which may reduce the viscosity of the combined inner, middle and outer layer melt flows as they flow through melt passage 1083 to thereby increase the speed of the combined materials, which may help to stabilize the newly combined melt flows. Second mold gate part melt passage 1083 directs the combined melt flows to mold gate 1024 of a third mold gate part 1022C.

In the embodiment of FIG. 10, valve pin 1026 has tip portion 1028 seated with mold gate 1024 of third mold gate part 1022C such that the mold gate is closed and no melt flows therethrough. When valve pin tip portion 1028 is retracted from mold gate 1024 and each of the first and second melt streams are being injected, the inner, middle and outer layer melt flows exiting central, middle and outer melt passages 974, 972, 980 of nozzle tip 954 via annular outlets 947, 957, 987, respectively, combine within bubble area 1069 proximate the gate area of to simultaneously flow through melt outlet 1053 of first mold gate part 1022A and melt passage 1083 of second mold gate part 1022B into mold cavity 1033 via mold gate 1024 of third mold gate part 1022C to form a three layer molded article as similarly described above with reference to the previous embodiments. It would be understood by one of ordinary skill in the art that valve pin 1026 may be actuated between the open, retracted and closed, seated positions in a conventional manner, such as by modifying the operation of the valve pin actuation system shown in the embodiment of FIG. 1.

Mold gate first and second parts 1022A, 1022B may be secured to one and other by any suitable fasteners or by brazing. Heated mold gate second part 1022B sits within cooled mold gate third part 1022C in an insulative air space 1089 defined therebetween, such that mold gate second part 1022B makes contact with mold gate third part 1022C only at sealing surface 1091. Mold gate first part 1022A is situated within and makes contact with mold plate 1009 and mold gate third part 1022C is situated within and makes contact with mold cavity plate 1011. Mold gate second part 1022B extends between mold plate 1009 and mold cavity plate 1011 to be thermally isolated therefrom by mold gate first and third parts 1022A, 1022C.

Figure 11:
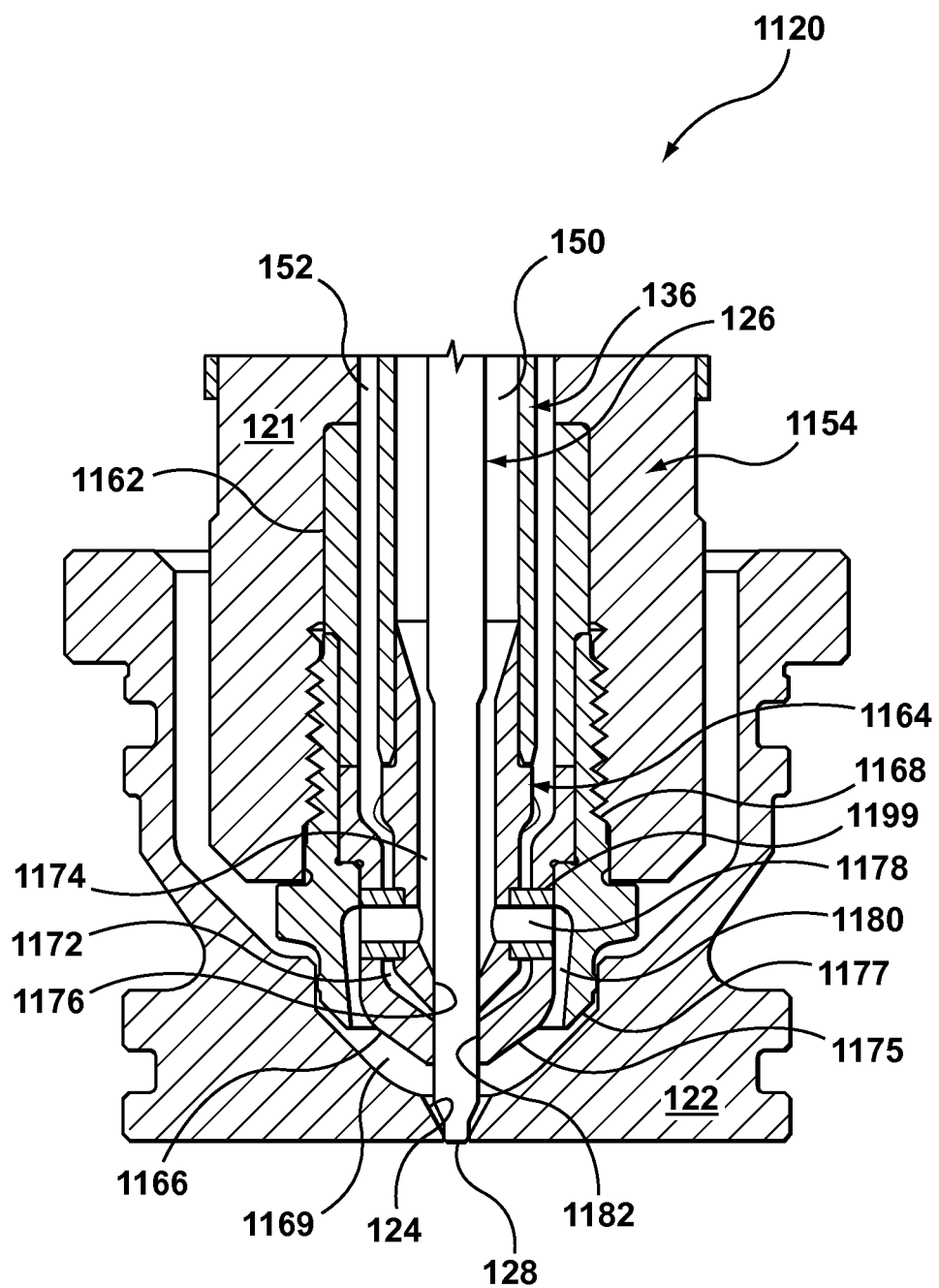
FIG. 11 is a sectional view of a gate area of a nozzle in accordance with another embodiment hereof.

FIG. 11 is a sectional view of a gate area of a nozzle 1120 in accordance with another embodiment hereof. Features and aspects of other embodiments described herein may be used accordingly with the current embodiment and the same reference numbers are used for features of nozzle 1120 that remain unchanged from nozzle 120 described above, as such those features are not further described. Similar to nozzle tip 154 and tip retainer 168, a nozzle tip 1154 of nozzle 1120 includes a tip base 1162, a tip divider 1164 and a tip cap 1166 that are retained by a threaded tip retainer 1168 within a downstream end of nozzle body 121 with downstream surfaces 1175, 1177 of tip cap 1166 and tip retainer 1168, respectively, being spaced from gate insert 122 by a bubble area 1169 that surrounds gate 124.

Tip base 1162 includes an inner surface that opposes an outer surface of sleeve 136 to define the portion of core material melt channel 152 that runs within nozzle tip 1154. Tip divider and tip cap 1164, 1166 define a core material melt passage 1172 that receives and directs the melt stream of core material from core material melt channel 152 through a central opening 1182 of tip cap 1166 to gate 124. Tip divider 1164 also defines a central skin material melt passage 1174 that receives the melt stream from sleeve skin material melt channel 150 and directs the melt stream of skin material to exit tunnel channels 1178 to form an outer layer flow of skin material and to exit a central opening 1176 of tip divider 1164 to form an inner layer flow of the skin material. The inner layer flow of the skin material also passes through central opening 1182 of tip cap 1166 as it flows toward mold gate 124.

Each tunnel channel 1178 has an inlet in fluid communication with central skin material melt passage 1174 and an outlet in fluid communication with an outer layer melt passage 1180, which is formed between an outer surface of tip cap 1166 and an inner surface of tip retainer 1168. Each tunnel channel 1178 includes a downstream portion that is defined by a separate tunnel channel extension 1199, which is a short tubular component. Each tunnel channel extension 1199 has an upstream end secured within a corresponding counter bore of tip divider 1164 and a length that bridges core material melt passage 1172 to pass through a bore within tip cap 1166. When so positioned, the outlet of each tunnel channel extension 1199 is in fluid communication with outer layer melt passage 1180 through which a portion of the melt stream of skin material received by each tunnel channel 1178 is directed to gate 124. Each tunnel channel 1178 may be considered laterally or radially extending in that it allows the molding material to flow sideways or outward relative to the general flow of molding material in central skin material melt passage 1174. As well, tunnel channel extensions 1199 and/or tunnel channels 1178 defined thereby may be described to cross, or as crossing, the core material melt passage 1172 and/or the core material melt stream that flows there through. Further in the embodiment of FIG. 11, tip divider 1164 does not include longitudinal bores, such as longitudinal bores 192 of tip divider 164, as the core material melt stream is able to flow around and between the outer surfaces of tunnel channel extensions 1199 within core material melt passage 1172.

In FIG. 11, tip portion 128 of valve pin 126 is seated within gate 124 and tip guiding segment 131 is seated within central openings 1176, 1182 of tip divider 1164 and tip cap 1166 such that neither the skin or core material is able to flow into the mold cavity (not shown) from the core material melt passage 1172, central skin material melt passage 1174, or outer layer melt passage 1180. As in the embodiment described with reference to FIGS. 3A-3D and 4A-4D, selective retraction of valve pin 126 from mold gate 124 and subsequently through central openings 1176, 1182 permits the simultaneous flow of the inner and outer layers of skin material from the skin material melt passage 1174 and the outer layer melt passage 1180, respectively, as well as the flow of core layer melt flow from the core material melt passage 1172 with the three melt flows combining in bubble area 1169 proximate the gate area of the coinjection apparatus to thereafter simultaneously enter a mold cavity (not shown) via gate 124. In this manner, the present embodiment permits the formation of a three layer molded article as similarly described above with reference to the previous embodiments.

Figure 12:
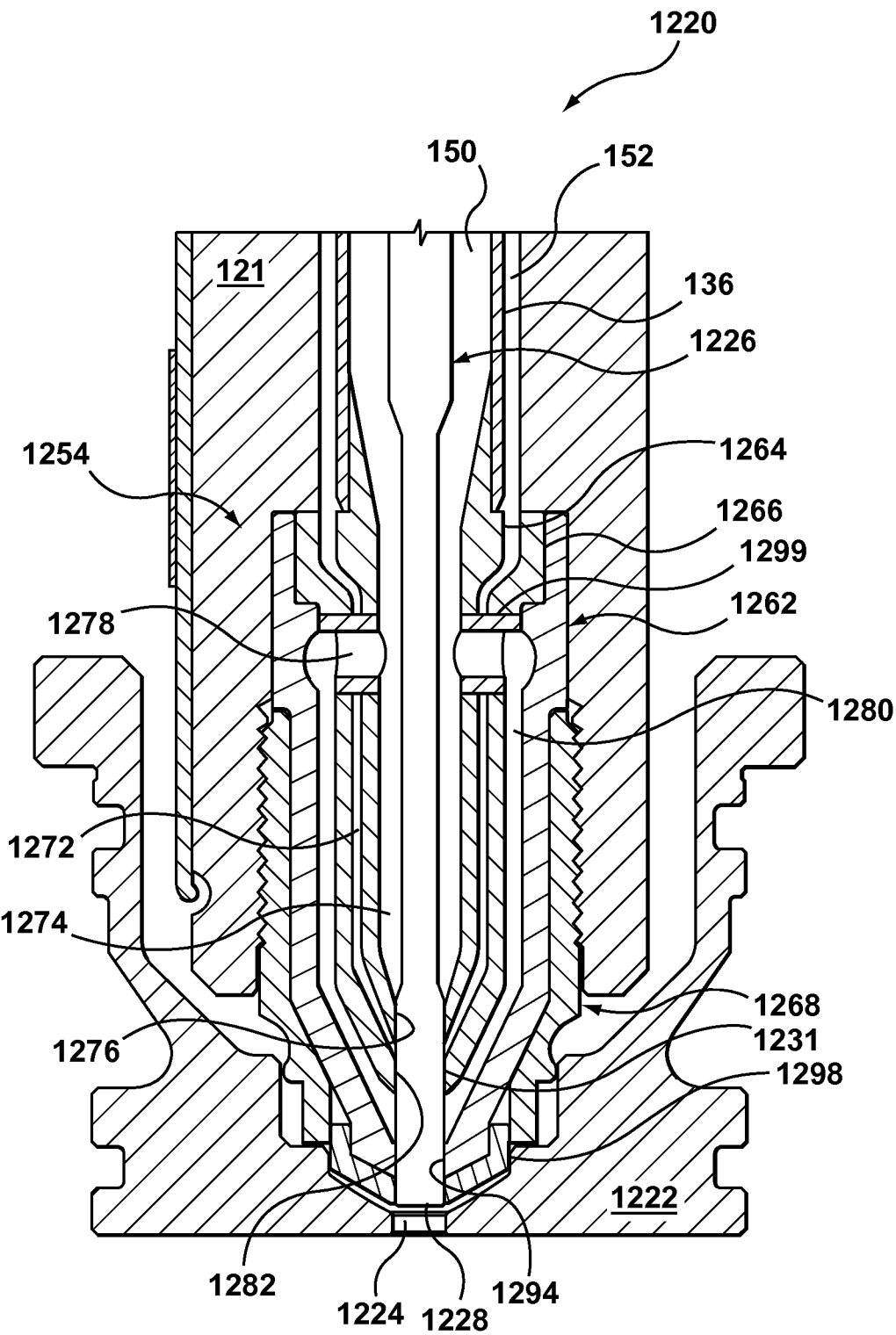
FIG. 12 is a sectional view of a gate area of a nozzle in accordance with another embodiment hereof.

FIG. 12 is a sectional view of a gate area of a nozzle 1220 in accordance with another embodiment hereof. Features and aspects of other embodiments described herein may be used accordingly with the current embodiment and the same reference numbers are used for features of nozzle 1120 that remain unchanged from nozzle 120 described above, as such those features are not further described. Nozzle 1220 has a multiple piece nozzle tip 1254 that is retained within a downstream bore of nozzle body 121 by a threaded tip retainer 1268. Nozzle tip 1254 includes a tip base 1262, a tip divider 1264, and a tip cap 1266 as well as a plurality of tunnel channel extensions 1299 that are brazed or otherwise fixed together to form a series of nozzle tip melt passages through nozzle tip 1254. More particularly, tip divider and tip cap 1264, 1266 define a core material melt passage 1272 that receives and directs the melt stream of core material from core material melt channel 152 through a central opening 1282 of tip cap 1266 to gate 1224. Tip divider 1264 also defines a skin material melt passage 1274 that receives the melt stream from sleeve skin material melt channel 150 and directs the melt stream of skin material to exit tunnel channels 1278 to form an outer layer flow of skin material and to exit a central opening 1276 of tip divider 1264 to form an inner layer flow of the skin material. The inner layer flow of the skin material also passes through central opening 1282 of tip cap 1266 as it flows toward mold gate 1224. In contrast to the embodiments depicted above, the structure of tip base 1262 extends into the gate area between tip retainer 1268 and tip cap 1266 such that an inner surface of tip base 1262 that opposes an outer surface of tip cap 1266 defines an outer layer melt passage 1280 for receiving the outer layer flow of skin material from tunnel channels 1278 and delivering the outer layer flow through a central opening 1294 of tip base 1262 to mold gate 1224.

Each of tip base 1262, tip divider 1264, and/or tip cap 1266 of nozzle tip 1254 is made of thermally or highly thermally conductive materials, such as beryllium copper. In the present embodiment, with the outer layer melt passage 1280 formed between two thermally conductive components of nozzle tip 1254 instead of between a nozzle tip component and a more insulative tip retainer as in the previous embodiments, an outer layer flow of skin material through outer layer melt passage 1280 may stay at or near the higher operating temperatures for certain polymeric materials, such as those associated with running polyethylene terephthalate (PET). Further each of the inner layer flow of skin material delivered from skin material melt passage 1274 and the core material flow delivered from core material melt passage 1272 must also pass through central opening 1294 of tip base 1262 as they flow towards mold gate 1224 such that the three melt flow effectively combine within the hot nozzle tip 1254 prior to entering the cooled mold gate, which is a desirable arrangement for molding articles of PET. In order to prevent heat loss from tip base 1262 in the area of gate 1224 a thermally insulative cap 1298 of VESPEL or the like may be positioned between a downstream face of tip base 1262 and gate insert 1222 to prevent contact there between.

Each tunnel channel 1278 has an inlet in fluid communication with skin material melt passage 1274 and an outlet in fluid communication with outer layer melt passage 1280. In the embodiment of FIG. 12, tunnel channels 1278 are positioned adjacent an upstream end of nozzle tip 1254 and are not formed by tip divider 1264. Instead each tunnel channel 1278 is defined by a separate tunnel channel extension 1299, which is a short tubular component. Each tunnel channel extension 1299 has an upstream end secured within a corresponding bore of tip divider 1264 and a downstream end secured within a corresponding bore of tip cap 1266 with a length that bridges core material melt passage 1272 there between. When so positioned, the inlet and outlet of each tunnel channel extension 1299 is in fluid communication with skin material melt passage 1274 and outer layer melt passage 1280, respectively. Each tunnel channel 1278 may be considered laterally or radially extending in that it allows the molding material to flow sideways or outward relative to the general flow of molding material in skin material melt passage 1274. Further in the embodiment of FIG. 12, tip divider 1264 does not include longitudinal bores, such as longitudinal bores 192 of tip divider 164, as the core material melt stream is able to flow around and between the outer surfaces of tunnel channel extensions 1299 within core material melt passage 1272.

In FIG. 12, an enlarged tip guiding segment 1231 of valve pin 1226 is seated within central openings 1276, 1282, 1294 of tip divider 1264, tip cap 1166 and tip base 1262 such that neither the skin or core material is able to flow into the mold cavity (not shown) from the nozzle tip skin material melt passage 1274, the core material melt passage 1272, or the outer layer melt passage 1280. The retraction of a tip portion 1228 of valve pin 1226 from mold gate 1224 and subsequently through each of central openings 1276, 1282, 1294 permits the simultaneous flow of the inner and outer layers of skin material from the skin material melt passage 1274 and the outer layer melt passage 1280, respectively, as well as the flow of the core layer melt flow from the core material melt passage 1272 to thereby permit the formation of a three layer molded article.

Although coinjection apparatus 100 is shown with a one-piece mold gate insert 122 that defines mold gate 124, other embodiments may have a multiple piece mold gate insert component, for example, as shown in the embodiment of FIG. 10, or may not have a mold gate insert but instead simply having a well in a mold plate. As well without departing from the scope of the present invention, mold gate insert 122 may or may not have a surface that provides a portion of the mold cavity and may or may not include cooling channels (not shown) for circulating cooling fluid to assist in solidifying the molding material in the mold cavity.

Figure 13:
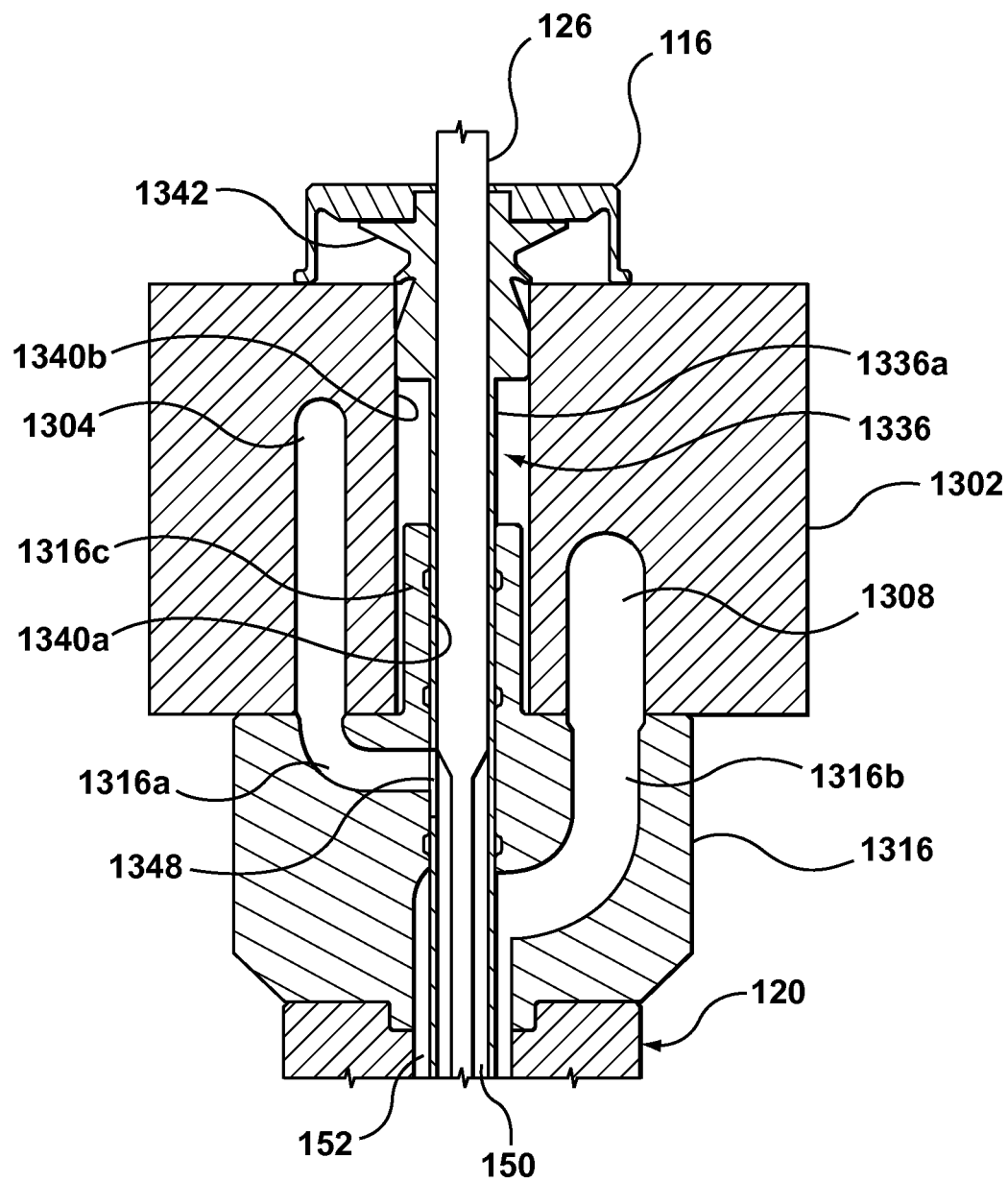
FIG. 13 is a sectional view of a portion of a coinjection hot runner injection molding system in accordance with another embodiment hereof.

Although each of the embodiments described above depicts the first and second melt streams being directed from a respective manifold runner directly into a respective inner and outer melt channel of the system that extends to a mold gate thereof, in other embodiments a valve pin bushing may include melt channels for receiving the skin material and core material melt streams from the respective manifold runners and directing them to respective skin material and core material melt channels of the hot runner nozzle in fluid communication therewith. An exemplary valve pin bushing 1316 that may be adapted for use in embodiments hereof is disclosed in FIG. 13. Valve pin bushing 1316 is positioned between hot runner manifold 1302 and nozzle 120 and includes a bore 1340a extending therethrough for receiving sleeve 1336, which in turn guides valve pin 126. In the embodiment of FIG. 13, sleeve 1336 includes a head segment 1342 that is a separate component from sleeve tubular body 1336a, wherein a gap exists between the two components to accommodate for thermal expansion under operating condition. Similarly, a gap exists between a guiding extension 1316c of valve pin bushing 1316 and bore 1340b of manifold 1302 to accommodate for thermal expansion under operating condition. Valve bushing 1316 and the series of gaps discussed above allows for thermal expansion of manifold 1302 to occur without influencing the alignment of the valve pin 126 with the gate.

Bushing 1316 includes a skin material melt channel 1316a for receiving the skin material melt stream from a first set of melt channels 1304 of manifold 1302 and a core material melt channel 1316b for receiving the core material melt stream from a second set of melt channels 1308 of manifold 1302. Skin material melt channel 1316a transfers the skin material melt stream to skin material melt channel 150 of nozzle 120 via opening 1348 and core material melt channel 1316b transfers the core material melt stream to core material melt channel 152 of nozzle 120. In an embodiment, the valve pin bushing 1316 may be fixed to nozzle 120 by bolting or such to ensure stability during thermal expansion. In embodiments hereof, valve pin bushing 1316 may include heater.

Any of the movable sleeve embodiments described above may be adapted to be used in gas-assist injection molding applications. In such embodiments, a core material would be a gas, such as nitrogen, instead of a polymeric material. The gas would be supplied as a middle layer material to the molded article being produced.

In addition, although each of the embodiments described above is discussed as performing simultaneous injection of the first and second moldable materials within a mold cavity, systems in accordance with embodiments hereof may be actuated to perform sequential injection of the first and second moldable materials as may be preferable in certain molding applications, such as in the molding of thicker parts.

Materials for the components of the coinjection apparatus described herein include steel, tool steel (H13), copper alloy, copper-beryllium, titanium, titanium alloy, ceramic, high-temperature polymer, and similar materials. In an embodiment, the nozzle tip base may be made of TZM or molybdenum and the nozzle tip divider and cap parts as well as the tip retainer may each be made of H13.

While various embodiments according to the present invention have been described above, it should be understood that they have been presented by way of illustration and example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. A coinjection nozzle for delivering molding material to a mold gate, the coinjection nozzle comprising:
   a nozzle tip coupled to a downstream end of the nozzle, the nozzle tip having,
      a first material melt passage for receiving a first material melt stream from a first material melt source,
      a second material melt passage for receiving a second material melt stream from a second material source,
      a tunnel channel extension defining a tunnel channel, and
      an outer layer melt passage fluidly connected to the first material melt passage via the tunnel channel, wherein the tunnel channel directs a portion of the first material melt stream received by the first material melt passage to the outer layer melt passage, and wherein the tunnel channel crosses the second material melt passage such that the second material melt stream flows around an outer surface of the tunnel channel extension.

2. The coinjection nozzle of claim 1 further comprising:
   a sleeve disposed to extend within a longitudinal nozzle bore of the nozzle to divide the nozzle bore into the first material melt passage and the second material melt passage, wherein the first material melt passage is defined by an inner surface of the sleeve and the second material melt passage is defined between an outer surface of the sleeve and the nozzle bore.

3. The coinjection nozzle of claim 2, wherein the nozzle tip includes a tip divider that defines the first material melt passage and includes an opening through a downstream end thereof that is axially aligned with the mold gate.

4. The coinjection nozzle of claim 3, wherein the tip divider includes an upstream extension that is received within a downstream end of the sleeve.

5. The coinjection nozzle of claim 4, wherein the tunnel channel extension is formed independent of the tip divider.

6. The coinjection nozzle of claim 5, wherein the nozzle tip includes a tip cap having at least a portion of an inner surface thereof that is spaced from an outer surface of the tip divider to define a downstream portion of the second material melt passage therebetween and wherein the tip cap includes an opening through a downstream end thereof that is axially aligned with the tip divider opening and the mold gate.

7. The coinjection nozzle of claim 6, wherein the tunnel channel extension of the nozzle tip is a plurality of tunnel channel extensions that cross the second material melt passage such that the second material melt stream flows around outer surfaces of the plurality of tunnel channel extensions.

8. The coinjection nozzle of claim 7, wherein the nozzle tip includes a tip base with a downstream end in contact with the tip cap, the tip base having an inner surface that is spaced from an outer surface of a segment of the sleeve that extends within the nozzle to define an upstream portion of the second material melt passage therebetween.

9. The coinjection nozzle of claim 7, wherein the nozzle tip includes a tip base having an inner surface that is spaced from an outer surface of a segment of the tip cap to define at least a portion of the outer layer melt passage therebetween.

10. The coinjection nozzle of claim 9, wherein the plurality of tunnel channel extensions are positioned adjacent to an upstream end of the nozzle tip.

11. The coinjection nozzle of claim 10, wherein the plurality of tunnel channel extensions are at an acute angle relative to the first material melt passage.

12. The coinjection nozzle of claim 11, wherein the plurality of tunnel channel extensions, the tip divider, the tip cap and the tip base are brazed together.

13. The coinjection nozzle of claim 12, wherein the nozzle tip is secured within the downstream end of the nozzle via a tip retainer.

14. The coinjection nozzle of claim 13, wherein the tip retainer includes an inner surface that is spaced from an outer surface of the tip cap to define the outer layer melt passage therebetween.

15. The coinjection nozzle of claim 14, further comprising:
a valve pin slidably disposed through the first material melt passage and the axially aligned openings of the tip divider and the tip cap, the valve pin being actuatable between a gate closed position and a first retracted position, wherein when the valve pin is in the gate closed position a tip guiding segment of the valve pin blocks the axially aligned openings of the tip divider and the tip cap to prevent the first material melt stream within the first material melt passage and the second material melt stream within the second material melt passage from flowing toward the mold gate.

16. The apparatus of claim 15, wherein when the valve pin is in the first retracted position the valve pin is unseated from the mold gate while the tip guiding segment of the valve pin blocks the axially aligned openings of the tip divider and the tip cap such that only the portion of the first material melt stream from the outer layer melt passage is permitted to flow through the mold gate.

17. The coinjection nozzle of claim 16, wherein the valve pin is actuatable between the gate closed position, the first retracted position, and a second retracted position and wherein when the valve pin is in the second retracted position the valve pin is retracted upstream from the axially aligned openings of the tip divider and the tip cap such that the first material melt stream within the first material melt passage, the second material melt stream within the second material melt passage, and the portion of the first material melt stream within the outer layer melt passage are permitted to flow toward the mold gate.

18. The coinjection nozzle of claim 6, wherein the nozzle tip includes a tip base having an inner surface that is spaced from an outer surface of a segment of the tip cap to define at least a portion of the outer layer melt passage therebetween.

19. The coinjection nozzle of claim 18, wherein the tunnel channel extension is positioned adjacent to an upstream end of the nozzle tip.

20. The coinjection nozzle of claim 1, wherein the tunnel channel extension is positioned adjacent to an upstream end of the nozzle tip.

\* \* \* \* \*